(12) United States Patent
Mitomo

(10) Patent No.: US 12,272,965 B2
(45) Date of Patent: Apr. 8, 2025

(54) ELECTRONIC APPARATUS AND METHOD

(71) Applicant: KABUSHIKI KAISHA TOSHIBA, Tokyo (JP)

(72) Inventor: Toshiya Mitomo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 226 days.

(21) Appl. No.: 18/179,134

(22) Filed: Mar. 6, 2023

(65) Prior Publication Data

US 2023/0412005 A1 Dec. 21, 2023

(30) Foreign Application Priority Data

Jun. 15, 2022 (JP) ................................. 2022-096783

(51) Int. Cl.
*H02J 50/27* (2016.01)
*H01Q 1/24* (2006.01)
*H01Q 3/36* (2006.01)
*H02J 50/23* (2016.01)

(52) U.S. Cl.
CPC ............ *H02J 50/27* (2016.02); *H01Q 1/248* (2013.01); *H01Q 3/36* (2013.01); *H02J 50/23* (2016.02)

(58) Field of Classification Search
None
See application file for complete search history.

(56) References Cited

U.S. PATENT DOCUMENTS

| | | | | |
|---|---|---|---|---|
| 2002/0187753 A1* | 12/2002 | Kim | ...................... | H04W 52/42 455/73 |
| 2010/0260288 A1* | 10/2010 | Aoki | .................... | H04B 7/0452 375/296 |
| 2012/0076230 A1* | 3/2012 | Ibing | ................ | H04L 25/03012 375/295 |
| 2016/0285502 A1* | 9/2016 | Liu | ........................ | H04B 15/00 |

FOREIGN PATENT DOCUMENTS

| | | |
|---|---|---|
| JP | 2017-38193 A | 2/2017 |
| JP | 6441765 B2 | 12/2018 |
| JP | 2019-47341 A | 3/2019 |
| JP | 6512722 B2 | 5/2019 |
| WO | WO 2019/065054 A1 | 4/2019 |

* cited by examiner

*Primary Examiner* — Jared Fureman
*Assistant Examiner* — Joel Barnett
(74) *Attorney, Agent, or Firm* — Finnegan, Henderson Farabow, Garrett & Dunner, LLP

(57) ABSTRACT

An electronic apparatus, according to one embodiment, that is capable of wireless power transfer to a power receiver that transmits a wireless signal, comprising: N antenna elements; N wireless signal processing circuitries configured to acquire analog signals, based on wireless signals received by the N antenna elements; a first signal processing circuitry configured to acquire a first digital signal, based on a first analog signal that is the analog signal acquired by a first wireless signal processing circuitry; a first selector configured to select one of second analog signals that are the analog signals acquired by (N−1) second wireless signal processing circuitries; a second signal processing circuitry configured to acquire a second digital signal, based on the (Continued)

second analog signal selected by the first selector; and a controller configured to estimate a channel from the power receiver, based on the first digital signal and the second digital signal.

20 Claims, 13 Drawing Sheets

| TIME t | SWITCHER 130 | | | | | | |
|---|---|---|---|---|---|---|---|
| | 130_2 | 130_3 | 130_4 | ... | 130_N-1 | 130_N |
| 0 TO T | ON | OFF | OFF | ... | OFF | OFF |
| T TO 2T | OFF | ON | OFF | ... | OFF | OFF |
| 2T TO 3T | OFF | OFF | ON | ... | OFF | OFF |
| 3T TO 4T | OFF | OFF | OFF | ... | OFF | OFF |
| ... | ... | ... | ... | ... | ... | ... |
| (N-3)T TO (N-2)T | OFF | OFF | OFF | ... | ON | OFF |
| (N-2)T TO (N-1)T | OFF | OFF | OFF | ... | OFF | ON |

FIG. 3

ELECTRONIC APPARATUS AND METHOD

CROSS REFERENCE TO RELATED APPLICATIONS

This application is based upon and claims the benefit of priority from the prior Japanese Patent Application No. 2022-096783, filed on Jun. 15, 2022, the entire contents of which are incorporated herein by reference.

FIELD

Embodiments described herein relate to an electronic apparatus and method.

BACKGROUND

As a scheme for wireless power transfer, a retrodirective scheme has been known in which faint radio-wave signals (beacon signals) transmitted by wireless equipment that is a power transfer target (power receiver) are received by a plurality of antenna elements on a power transmission side, and a power transfer signal is transmitted in a direction of the power receiver estimated based on the beacon signals. Estimation of the direction of the power receiver is performed through channel estimation using a difference in phase, or differences in phase and amplitude, of the received beacon signal between the plurality of antenna elements. On the other hand, when power is transmitted, in order to prevent harmful effects on other wireless equipment that is not the power transfer target, it is necessary to confirm that there is no other wireless equipment in a direction in which the power transfer signal is transmitted (the direction of the power receiver). Such confirmation can be made by determining whether or not a radio-wave signal transmitted from any other wireless equipment is observed in the direction in which the power transfer signal is transmitted. To obtain an excellent S/N ratio in the observation, that is, to enhance a degree of accuracy in detection of other wireless equipment, it is preferable to perform reception beamforming in the direction in which the power transfer signal is transmitted.

For beamforming, a digital beamforming (DBF) scheme and an analog beamforming (ABF) scheme are mainly used. In the DBF scheme, each antenna element converts a received signal into a digital signal and then performs processing such as phase shift and synthesis, and the signal S/N ratio can be enhanced. However, expensive elements for digital signal processing, such as a quadrature mixer circuit, a filter, and an A/D converter, need to be provided to each of the plurality of antenna elements, so that costs become higher as the number of antenna elements increases. In contrast, in a wireless power transfer apparatus adopting the ABF scheme, since each antenna element performs processing such as phase shift and synthesis on a received signal in a state of analog signal, a place where the elements for digital signal processing are used can be limited, so that lower costs can be achieved. However, in the wireless power transfer apparatus adopting the ABF scheme, channel estimation cannot be performed because a phase difference and an amplitude difference between the antenna elements cannot be acquired.

BRIEF DESCRIPTION OF THE DRAWINGS

FIG. 3 is a schematic diagram showing an example of operation of switchers;

DETAILED DESCRIPTION

According to one embodiment, an electronic apparatus that is capable of wireless power transfer to a power receiver that transmits a wireless signal, includes N antenna elements (N is a natural number greater than or equal to 3); N wireless signal processing circuitries configured to acquire analog signals, based on wireless signals received by the N antenna elements; a first signal processing circuitry configured to acquire a first digital signal, based on a first analog signal that is the analog signal acquired by a first wireless signal processing circuitry among the N wireless signal processing circuitries; a first selector configured to select one of second analog signals that are the analog signals acquired by (N−1) second wireless signal processing circuitries different from the first wireless signal processing circuitry among the N wireless signal processing circuitries; a second signal processing circuitry configured to acquire a second digital signal, based on the second analog signal selected by the first selector; and a controller configured to estimate a channel from the power receiver, based on the first digital signal and the second digital signal.

Hereinafter, embodiments of the present invention are described with reference to the drawings.

First Embodiment

First Configuration Example (Channel Estimation)

Figure 1:
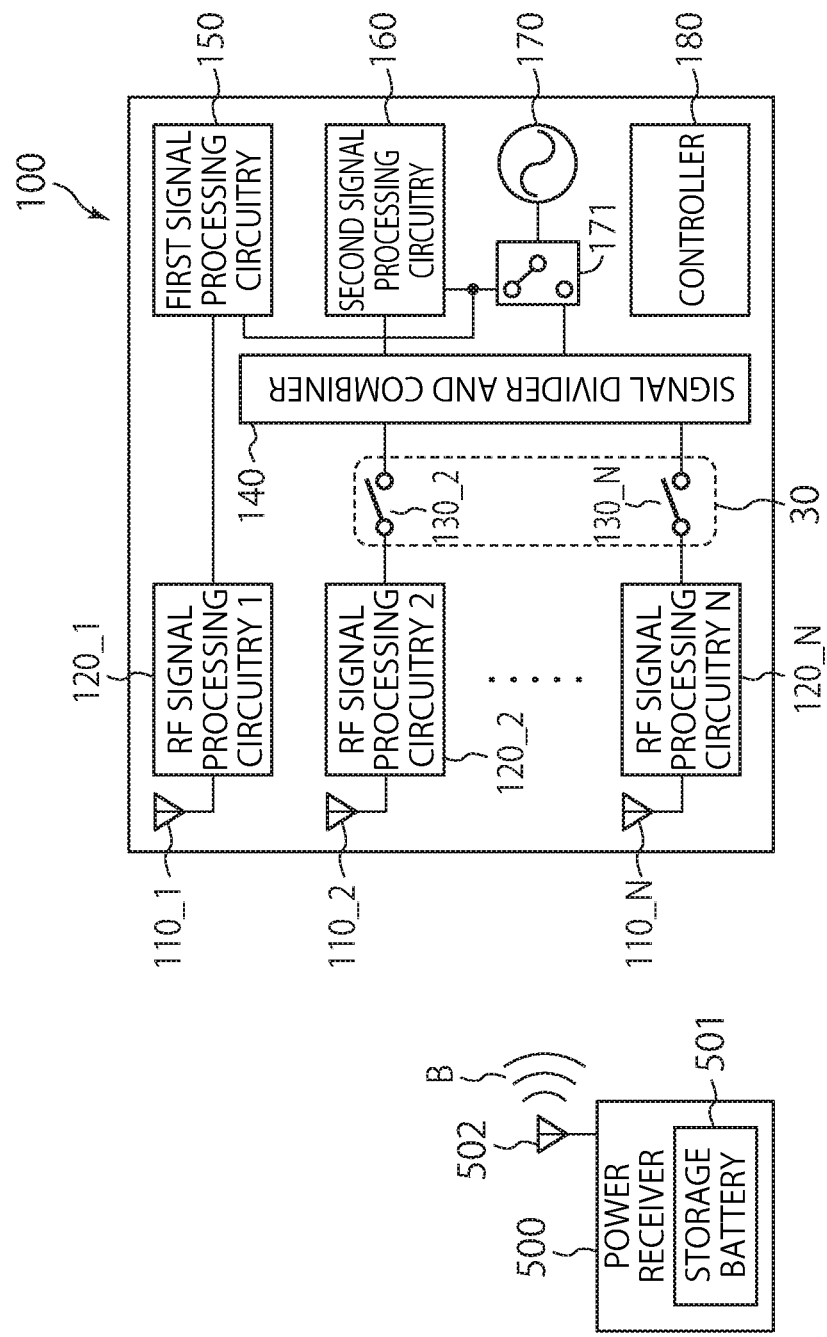
FIG. 1 is a block diagram of a wireless power transfer apparatus according to a first configuration example of a first embodiment.
Figure 2:
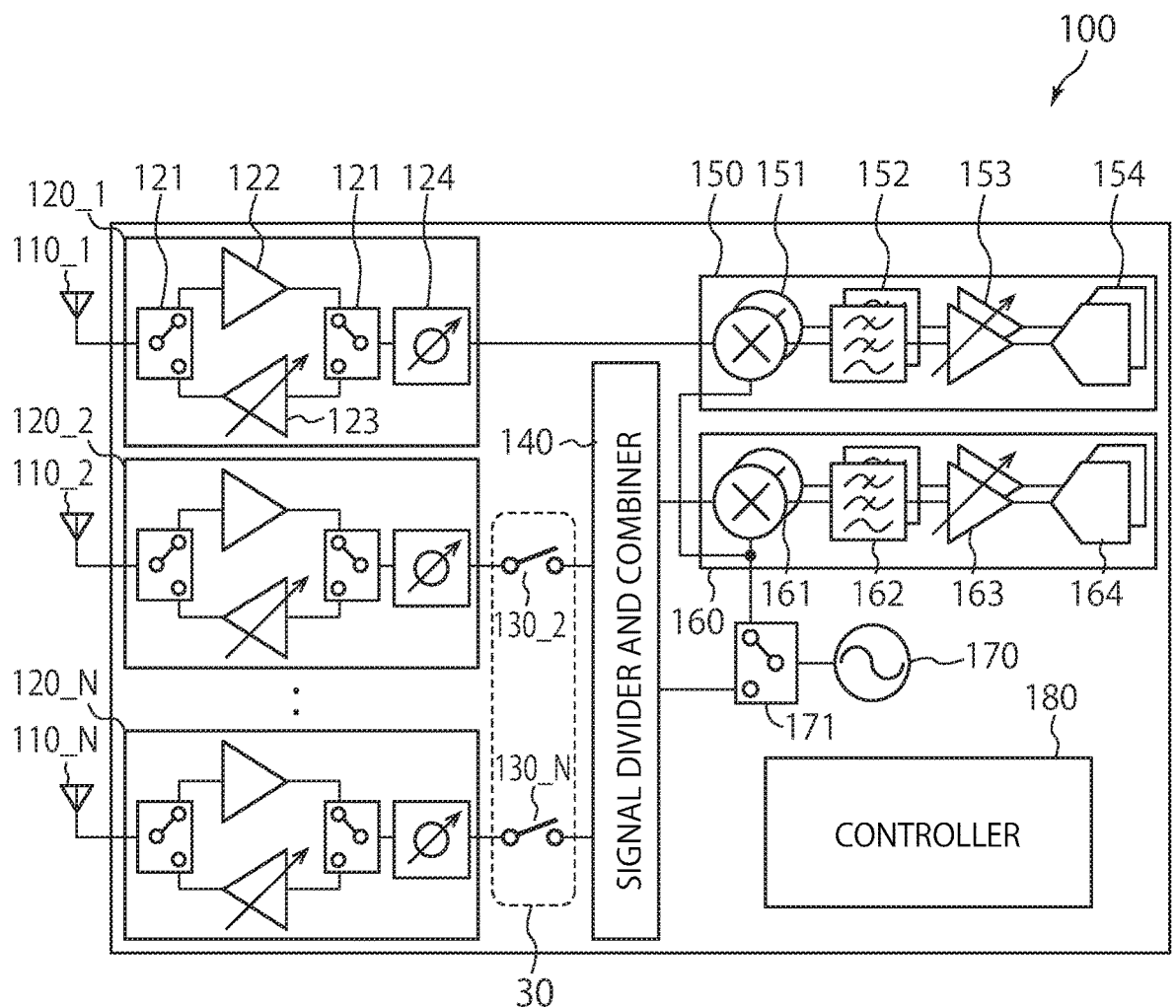
FIG. 2 is a block diagram showing a detailed configuration of the wireless power transfer apparatus according to the first configuration example of the first embodiment.

FIG. 1 shows a power transfer system including a wireless power transfer apparatus (electronic apparatus) 100 and a power receiver 500, according to a first configuration example of a first embodiment. FIG. 2 shows an example of a detailed configuration of the wireless power transfer apparatus 100. For safe and reliable wireless power transfer, the first configuration example implements channel estimation, which is performed to identify with high accuracy a direction of a power receiver that is a power transfer target, with a simple configuration.

The wireless power transfer apparatus 100 includes: a plurality of (N) antenna elements 110_1 to 110_N; a plurality of RF (radio frequency) signal processing circuitries 120_1 to 120_N; a selector 30 (first selector) including a plurality of switchers 130_2 to 130_N; a signal divider and combiner 140; a first signal processing circuitry 150; a second signal processing circuitry 160; a signal generator 170; a switcher 171; a controller 180; a wireless module (not shown) that performs communication with the power receiver; and the like. The RF signal processing circuitries 120_1 to 120_N are also referred to as high-frequency signal processing circuitries or wireless signal processing circuitries.

The RF signal processing circuitries, the selector 30, the signal divider and combiner 140, the first signal processing circuitry 150, the second signal processing circuitry 160, the signal generator 170, the switcher 171, and the controller 180, at least one or some thereof, may be formed by using a circuit, such as ASIC (application specific integrated circuit) or FPGA (field-programmable gate array), or a processor. Alternatively, one or some, or all, of the above-mentioned elements may be implemented by a CPU executing a program.

The power receiver 500 is included in a device that is a power transfer target of the wireless power transfer apparatus 100. The device that is the power transfer target is, for example, an IoT (internet of things) sensor, a camera, or the like used in a facility such as a factory. The power receiver 500 may be mounted in a mobile object such as a mobile robot, an AGV (automatic guided vehicle), or a drone. The power receiver 500 includes a chargeable and dischargeable storage battery 501, an antenna 502, and the like. The power receiver 500 can receive, via the antenna 502, a power transfer signal transmitted from the wireless power transfer apparatus 100, and can charge the storage battery 501, based on the power transfer signal. The power receiver 500 can transmit, regularly or at any timing, a beacon signal that is a wireless signal notifying existence of the power receiver 500 itself. The power receiver 500 includes: a communication circuit (not shown) that transmits and receives various signals via the antenna 502; a control circuit (not shown) that controls the entire power receiver 500; a rectification circuit (not shown) that rectifies a received RF signal into a direct current; a charge control circuit (not shown); a wireless module (not shown) that performs communication with the wireless power transfer apparatus 100; and the like.

The power receiver 500 transmits a beacon signal B at regular intervals. The power receiver 500 may transmit a beacon signal B or another arbitrary signal in response to a request signal from the wireless power transfer apparatus 100. A duration of one beacon signal B is, for example, a few or several milliseconds. The beacon signal B is, for example, a microwave signal.

The wireless power transfer apparatus 100 receives beacon signals B at the plurality of antenna elements 110_1 to 110_N, and performs channel estimation. For channel estimation, the wireless power transfer apparatus 100 uses, for a reference signal, a beacon signal B received by an antenna element (reference antenna element) at a reference position, and at the same time, uses, for a comparison signal, a beacon signal B received by an antenna element (comparison antenna element) at a different position from the position of the reference antenna element. Even if radio-wave signals are from the same transmission source, differences in arrival time, propagation loss, and the like occur between the radio-wave signal received by each antenna element, due to different propagation paths and the like. The differences in arrival time, propagation loss, and the like cause a phase difference and an amplitude difference between the radio-wave signal received by each antenna element. The wireless power transfer apparatus 100 acquires a phase difference and an amplitude difference between the reference signal and the comparison signal, and estimates a channel from the power receiver 500, based on the acquired phase difference, or the acquired phase difference and amplitude difference, between each antenna element. Thus, a direction or a position of the power receiver 500 can be estimated. By performing reception beamforming in the estimated direction of the power receiver 500 (a direction from which the beacon signals B come), the wireless power transfer apparatus 100 can check, before performing wireless power transfer, whether or not other wireless equipment to be protected for communication exists in the direction of the power receiver 500. Moreover, through transmission beamforming, the wireless power transfer apparatus 100 can perform wireless power transfer to the power receiver 500 with high efficiency. In the first configuration example, a configuration and operation for performing channel estimation are mainly described, and other operation performed after the channel estimation, and configurations for such operation, are described in detail in description of second and subsequent configuration examples.

Hereinafter, details of each constituent element are described with reference to FIGS. 1 and 2.

The antenna elements 110_1 to 110_N are antenna elements used to transmit a signal to and receive a signal from the power receiver 500. The number of the antenna elements 110_1 to 110_N is, for example, three or more (N≥3, N is a natural number). The antenna elements 110_1 to 110_N are placed in an arbitrary arrangement, at positions that are different from each other. For example, the antenna elements 110_1 to 110_N are arranged in an array form. Hereinafter, any one antenna element is referred to as antenna element 110, in some cases.

Hereinafter, the antenna element 110_1 is assumed to be a reference antenna element (first antenna element) for channel estimation. The antenna elements 110_2 to 110_N are assumed to be comparison antenna elements (second antenna elements) for channel estimation. The RF signal processing circuitry 120_1 connected to the reference antenna element corresponds to a first RF signal processing circuitry (first wireless signal processing circuitry), and each of the RF signal processing circuitries 120_2 to 120_N connected to the comparison antenna elements corresponds to a second RF signal processing circuitry (second wireless signal processing circuitry).

The RF signal processing circuitry 120_1 performs analog processing, such as amplification and phase shift, on a beacon signal B that is a wireless signal received by the antenna element 110_1, and acquires an analog signal (first analog signal). The RF signal processing circuitries 120_2 to 120_N perform analog processing, such as amplification and phase shift, on beacon signals B that are wireless signals received by the antenna elements 110_2 to 110_N, and acquire analog signals (second analog signals). The same number of the RF signal processing circuitries 120_1 to 120_N as the number of the antenna elements 110_1 to 110_N exist, and the RF signal processing circuitries 120_1 to 120_N correspond one for one to the antenna elements 110_1 to 110_N. For example, the RF signal processing circuitry 120_2 processes the beacon signal B received by the antenna element 110_2. Hereinafter, any one RF signal processing circuitry is referred to as RF signal processing circuitry 120, in some cases.

Moreover, although the beacon signals B are received by the antenna elements 110_1 to 110_N at the same time, the beacon signals B received by the antenna elements 110_1 to 110_N are referred to as beacon signals B_1 to B_N, respectively, in some cases. For example, the beacon signal B received by the antenna element 110_2 is the beacon signal B_2.

The beacon signal B_1 is assumed to be a reference signal for channel estimation, and the beacon signals B_2 to B_N are assumed to be comparison signals that are compared in phase and amplitude with the reference signal.

As shown in FIG. 2, each RF signal processing circuitry 120 includes a transmission-reception change switch 121, a reception amplifier 122, a transmission variable amplifier 123, and a phase shifter 124.

The transmission-reception change switch 121 is switched to a transmission variable amplifier 123 side when a signal such as a power transfer signal for wireless power transfer is transmitted, and is switched to a reception amplifier 122 side when a signal such as a beacon signal is received.

The reception amplifier 122 amplifies the received beacon signal B with a predetermined amplification factor. The number of reception amplifiers 122 is arbitrary.

The transmission variable amplifier 123 amplifies a signal to output (transmit) with an amplification factor set by the controller 180. The transmission variable amplifier 123 may include, for example, an amplifier and a variable attenuator.

The phase shifter 124 makes a phase shift in the amplified beacon signal B inputted from the reception amplifier 122. The amount of the phase shift made by the phase shifter 124 can be varied by the controller 180.

The switchers 130_2 to 130_N in the selector 30 switch between ON for connection and OFF for disconnection between the RF signal processing circuitries 120_2 to 120_N corresponding to the comparison antenna elements and the signal divider and combiner 140. The same number of the switchers 130_2 to 130_N as the number of the RF signal processing circuitries 120_2 to 120_N exist, and the switchers 130_2 to 130_N correspond one for one to the RF signal processing circuitries 120_2 to 120_N. For example, when the switcher 130_2 is ON, the RF signal processing circuitry 120_2 and the signal divider and combiner 140 are connected. The selector 30 includes a function of selecting, by using the switchers 130_2 to 130_N, one of signals (analog signals) processed by the RF signal processing circuitries 120_2 to 120_N, and outputting the selected signal to the second signal processing circuitry 160 via the signal divider and combiner 140. Hereinafter, any one switcher of the switchers 130_2 to 130_N is referred to as switcher 130, in some cases.

Each switcher 130 includes a switch, and switches between ON for connection and OFF for disconnection by using the switch. Note that each switcher 130 or the controller 180 may include a device, such as a computer, that temporarily turns off a power supply of each RF signal processing circuitry 120. In such a case, processing by the switcher 130 may be performed by an electric circuit, or may be performed by using a program.

The signal divider and combiner 140 receives one of the signals (second analog signals) acquired after the RF signal processing circuitries 120_2 to 120_N amplify and phase-shift the beacon signals B, and transmits the received signal to the second signal processing circuitry 160.

The signal generator 170 includes a local oscillator (LO). The signal generator 170 generates a local oscillator signal (LO signal) for frequency conversion.

The switcher 171 switches a destination (connection destination) to which the LO signal generated by the signal generator 170 is outputted. In channel estimation, the switcher 171 connects the signal generator 170 to the first signal processing circuitry 150 and the second signal processing circuitry 160. Thus, the LO signal generated by the signal generator 170 is fed to the first signal processing circuitry 150 and the second signal processing circuitry 160. Operation of connecting the signal generator 170 to the signal divider and combiner 140 is described in description of another configuration example, which will be described later.

The first signal processing circuitry 150 is connected to the RF signal processing circuitry 120 corresponding to the reference antenna element, and the first signal processing circuitry 150 receives a signal (first analog signal) acquired after the RF signal processing circuitry 120 corresponding to the reference antenna element amplifies and phase-shifts the reference signal (beacon signal B_1). By performing processing, such as frequency conversion and A/D conversion, on the signal, the first signal processing circuitry 150 acquires a digital signal (first digital signal) that includes information on a phase and an amplitude of the beacon signal B received by the reference antenna element.

The second signal processing circuitry 160 is connected to the RF signal processing circuitries 120 corresponding to the comparison antenna elements via the switchers 130 and the signal divider and combiner 140. The second signal processing circuitry 160 performs processing, such as frequency conversion and A/D conversion, on the signal (second analog signal) inputted from one of the RF signal processing circuitries 120 corresponding to the comparison antenna elements. Thus, a digital signal (second digital signal) that includes information on a phase and an amplitude of the beacon signal B received by the corresponding comparison antenna element is acquired.

More specifically, as shown in FIG. 2, the first signal processing circuitry 150 includes an orthogonal mixer 151 (first mixer), a lowpass filter 152, a variable gain amplifier 153, and an A/D converter 154. The second signal processing circuitry 160 includes an orthogonal mixer 161 (second mixer), a lowpass filter 162, a variable gain amplifier 163, and an A/D converter 164.

The orthogonal mixer 151 converts the signal inputted from the RF signal processing circuitry 120 corresponding to the reference antenna element into an I (in-phase) signal and a Q (quadrature) signal that are orthogonal to each other. The orthogonal mixer 151 multiplies the I signal and the Q signal by the LO signal generated by the signal generator 170 to perform frequency conversion to a baseband (BB) bandwidth. Thus, the I/Q orthogonal signals in the baseband bandwidth can be acquired. The phase and the amplitude can be acquired by using the I/Q orthogonal signals.

The orthogonal mixer 161 converts the signal inputted from one of the RF signal processing circuitries 120 corresponding to the comparison antenna elements into an I (in-phase) signal and a Q (quadrature) signal that are orthogonal to each other. The orthogonal mixer 161 multiplies the I signal and the Q signal by the LO signal generated by the signal generator 170 to perform frequency conversion to the baseband (BB) bandwidth. Thus, the I/Q orthogonal signals in the baseband bandwidth can be acquired. The phase and the amplitude can be acquired by using the I/Q orthogonal signals.

The lowpass filter 152 removes unnecessary high-frequency components included in the I signal and the Q signal subjected to the frequency conversion to the BB bandwidth by the orthogonal mixer 151.

The lowpass filter 162 removes unnecessary high-frequency components included in the I signal and the Q signal subjected to the frequency conversion to the BB bandwidth by the orthogonal mixer 161.

The variable gain amplifier 153 amplifies the signals (I signal and Q signal) outputted from the lowpass filter 152 to appropriate magnitudes. The variable gain amplifier 153 may include, for example, an amplifier and a variable attenuator. The variable gain amplifier 153 may exchange places with the lowpass filter 152 in arrangement.

The variable gain amplifier 163 amplifies the signals (I signal and Q signal) outputted from the lowpass filter 162 to appropriate magnitudes. The variable gain amplifier 163 may include, for example, an amplifier and a variable attenuator. The variable gain amplifier 163 may exchange places with the lowpass filter 162 in arrangement.

The A/D converter 154 converts the signals (I signal and Q signal) amplified by the variable gain amplifier 153 from analog signals to digital signals.

The A/D converter 164 converts the signals (I signal and Q signal) amplified by the variable gain amplifier 163 from analog signals to digital signals.

The controller 180 acquires the information on the phase and the amplitude of the beacon signal B_1 (reference signal) received by the reference antenna element, based on the digital signals (I signal and Q signal) from the first signal processing circuitry 150. The controller 180 acquires the information on the phase and the amplitude of the beacon signal (comparison signal) received by a comparison antenna element, that is the beacon signal received by the comparison antenna element corresponding to the RF signal processing circuitry selected by the selector based on the digital signals (I signal and Q signal) from the second signal processing circuitry 160. The controller 180 repeats acquisition of a phase and an amplitude of a beacon signal (reference signal) received by the reference antenna element, and acquisition of a phase and an amplitude of a beacon signal (comparison signal) received by a comparison antenna element, by switching an RF signal processing circuitry selected by the selector 30 in turn. The controller 180 performs channel estimation, based on information on phase differences between a plurality of pairs of the reference signals and the comparison signals acquired by the repetition, or the phase differences and amplitude differences acquired by the repetition.

In channel estimation, a pair of a reference signal and a comparison signal observed at the same time (observe means acquire information on a phase and an amplitude) are needed. In the present embodiment, for the plurality of comparison antenna elements, the number of signal processing circuitries that perform frequency conversion and A/D conversion on a comparison signal is only one, namely, the second signal processing circuitry 160. Comparison signals (I signal and Q signal) from all of the comparison antenna elements therefore cannot be observed at the same time. Accordingly, a comparison signal that is inputted into the second signal processing circuitry 160 is switched in each predetermined sampling time by using the switchers 130_2 to 130_N.

FIG. 3 is a table for describing operation of the switchers 130_2 to 130_N. "t" is time. The switchers 130_2 to 130_N switch between ON and OFF in each sampling time T, each in an arbitrary sampling time T. A sampling time T is, for example, a submillisecond period.

As shown in FIG. 3, at a certain time, one switcher 130 is selected, and the selected switcher 130 becomes ON, and the other switchers 130 become OFF. The switchers 130_2 to 130_N switch, according to all (N−1) ON-OFF patterns. For example, in a period of "t=0 to T", only the switcher 130_2 is ON, and in a period of "t=T to 2T", only the switcher 130_3 is ON. By repeating such switching, the switchers 130_2 to 130_N switch in turn until the last switcher 130_N becomes ON.

Thus, the switchers 130_2 to 130_N allow only the comparison signal (second analog signal) received by one comparison antenna element selected at a certain time to be inputted into the second signal processing circuitry 160.

Figure 4:
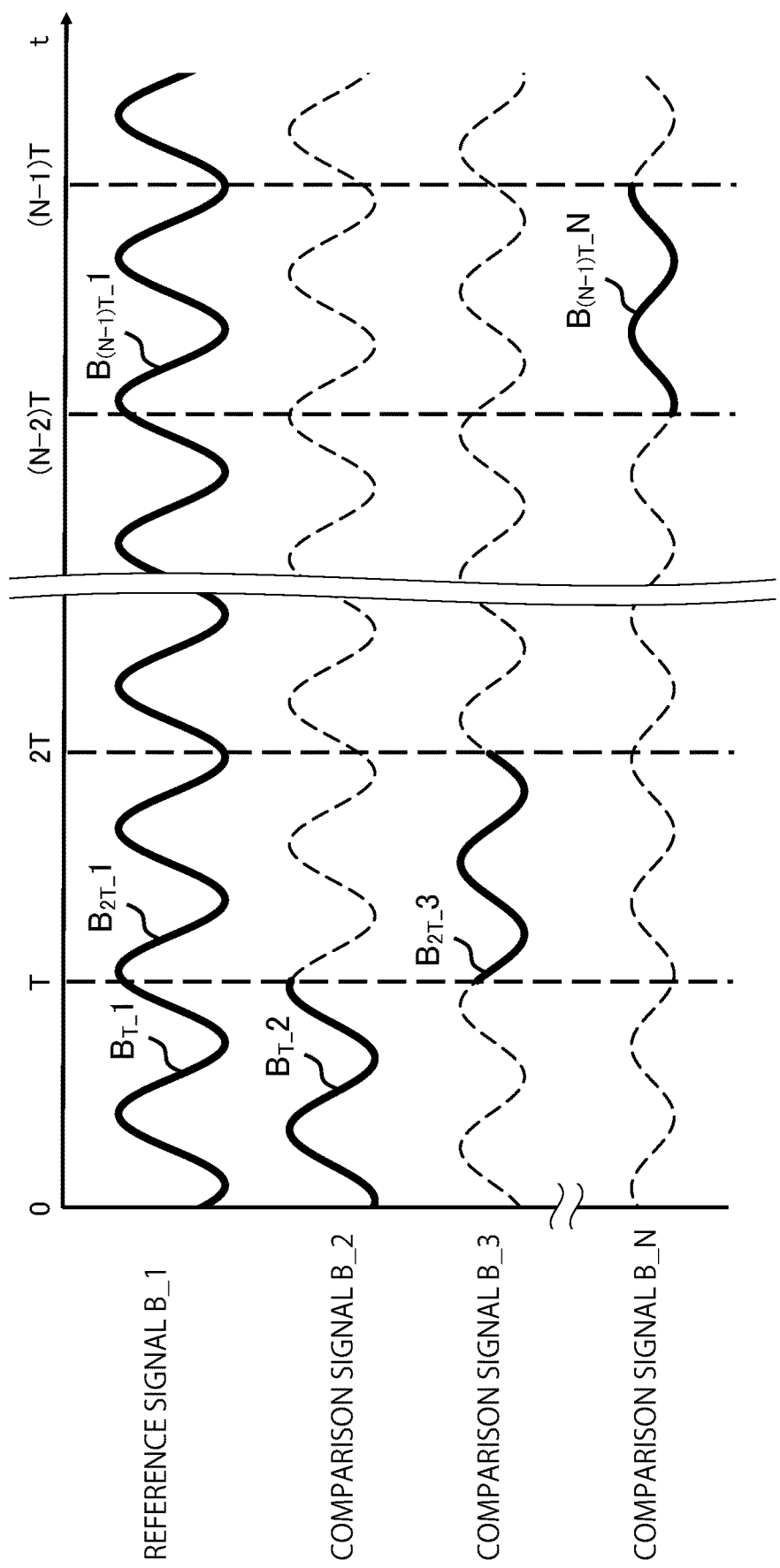
FIG. 4 is a schematic diagram showing signals that are processed by signal processing circuitries.

FIG. 4 shows the beacon signal B_1 (reference signal) that is processed by the first signal processing circuitry 150 and the beacon signals B_2 to B_N (comparison signals) that are processed by the second signal processing circuitry 160. A signal in a thick line portion is a signal that is actually processed, and a signal in a dashed line portion is not selected by the selector 30 and is therefore discarded (is not inputted into the second signal processing circuitry 160).

The first signal processing circuitry 150 is always connected to the RF signal processing circuitry 120_1. Accordingly, as shown in FIG. 4, the beacon signal B_1 (more specifically, the analog signal acquired by the RF signal processing circuitry 120 processing the beacon signal B_1) that is a reference signal is always processed by the first signal processing circuitry 150 for each sampling time T.

Here, for example, the beacon signal (more specifically, the analog signal acquired by the RF signal processing circuitry 120 processing the beacon signal) processed by the first signal processing circuitry 150 in the period of "t=0 to T" is denoted as beacon signal $B_{T\_1}$.

The second signal processing circuitry 160 is connected to an RF signal processing circuitry 120 corresponding to a comparison antenna element selected by the switchers 130_2 to 130_N, only for a period of the sampling time T. Accordingly, each of the beacon signals B_2 to B_N (more specifically, the analog signals acquired by the RF signal processing circuitries 120 respectively processing the beacon signals B_2 to B_N) that are comparison signals is processed by the second signal processing circuitry 160, only for a period when the corresponding switcher 130 is ON.

For example, in the period of "t=0 to T", since only the switcher 130_2 is ON, only the beacon signal B_2 (more specifically, the analog signal acquired by the RF signal processing circuitry 120 processing the beacon signal B_2) is processed by the second signal processing circuitry 160. Similarly, in the period of "t=T to 2T", since only the switcher 130_3 is ON, only the beacon signal B_3 among the comparison signals is processed by the second signal processing circuitry 160.

Here, for example, the beacon signal that is processed by the second signal processing circuitry 160 in the period of "t=0 to T" is denoted as beacon signal $B_{T\_2}$, and the beacon signal that is processed by the second signal processing circuitry 160 in the period of "t=T to 2T" is denoted as beacon signal $B_{2T\_3}$.

As shown in FIG. 4, in the period of "t=0 to T", the beacon signal $B_{T\_1}$ is processed by the first signal processing circuitry 150, and the beacon signal $B_{T\_2}$ is processed by the second signal processing circuitry 160. Then, information on respective phases and amplitudes of the processed beacon signal $B_{T\_1}$ and the processed beacon signal $B_{T\_2}$ is acquired by the controller 180, and amplitude and phase differences between the two beacon signals are calculated.

Thereafter, in the period of "t=T to 2T", the beacon signal $B_{2T\_}1$ is processed by the first signal processing circuitry 150, and the beacon signal $B_{2T\_}3$ is processed by the second signal processing circuitry 160. Then, information on respective phases and amplitudes of the processed beacon signal $B_{2T\_}1$ and the processed beacon signal $B_{2T\_}3$ is acquired by the controller 180, and amplitude and phase differences between the two beacon signals are calculated.

Thereafter, similarly, in a period of "t=(i−2)T to (i−1)T", a beacon signal $B_{(i-1)T\_}1$ is processed by the first signal processing circuitry 150, and a beacon signal $B_{(i-1)T\_}i$ is processed by the second signal processing circuitry 160. Then, information on respective phases and amplitudes of the processed beacon signal $B_{(i-1)T\_}1$ and the processed beacon signal $B_{(i-1)T\_}i$ is acquired by the controller 180, and amplitude and phase differences are calculated.

By repeating the above-described operation, the controller 180 acquires information on respective phases and amplitudes of the beacon signal B_1 and a beacon signal B_X (X=2 to N) measured at the same time at different positions, and calculates phase and amplitude differences. In other words, phase and amplitude differences are calculated for each of a pair of the beacon signal $B_{T\_}1$ and the beacon signal $B_{T\_}2$, a pair of the beacon signal $B_{2T\_}1$ and the beacon signal $B_{2T\_}3$, . . . , and a pair of the beacon signal $B_{(N-1)T\_}1$ and the beacon signal $B_{(N-1)T\_}N$. The controller 180 performs channel estimation, based on the acquired differences.

Figure 5:
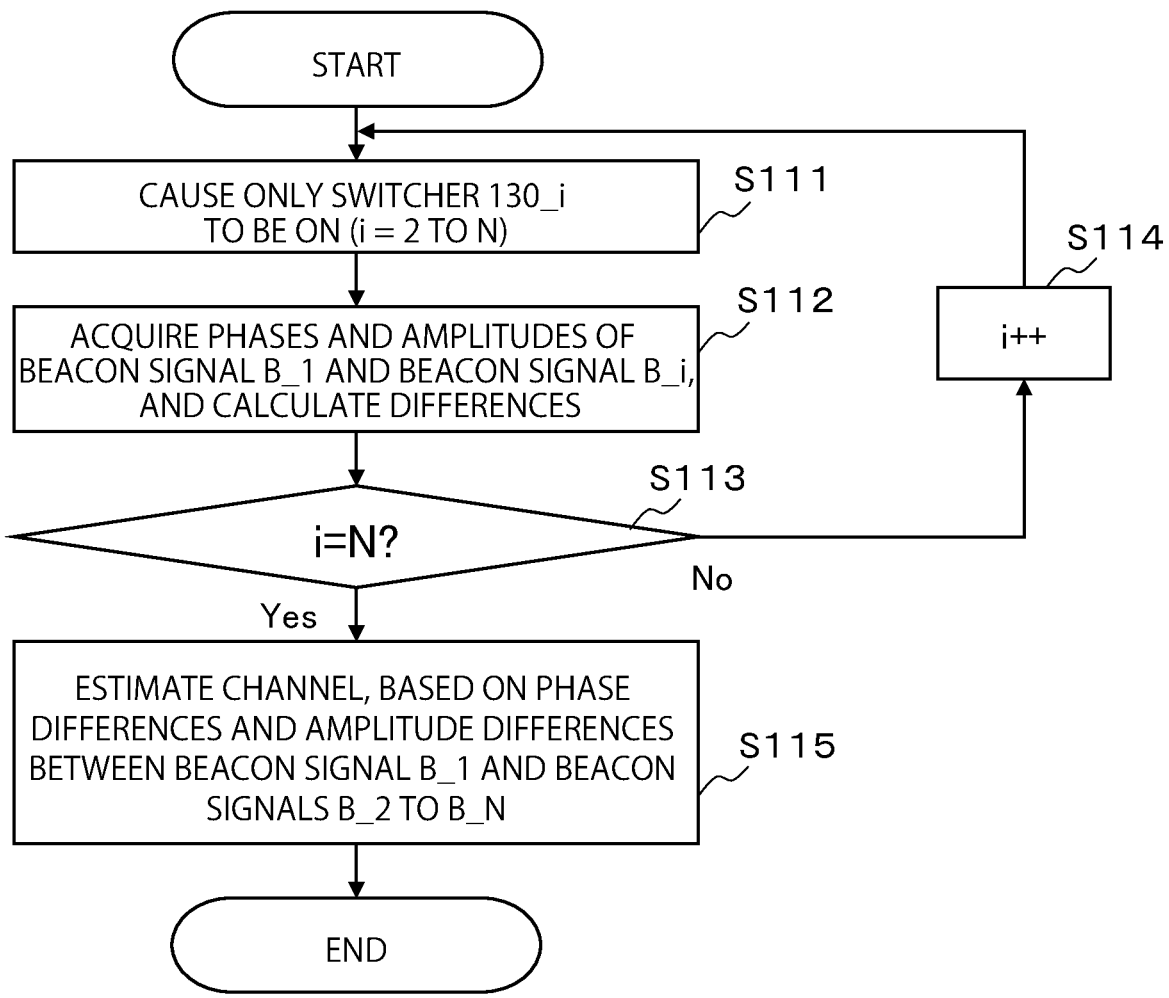
FIG. 5 is a flowchart of processing according to the first configuration example of the first embodiment.

FIG. 5 is a flowchart of processing performed by the wireless power transfer apparatus 100 in channel estimation.

In a period of "t=(i−2)T to (i−1)T", the controller 180 causes only the switcher 130_i to be ON (step S111). Here, i=2 to N, and for an initial value, i=2.

Next, the controller 180 acquires information on a phase and an amplitude of a beacon signal $B_{(i-1)T\_}1$ processed by the first signal processing circuitry 150 in the period of "t=(i−2)T to (i−1)T", and information on a phase and an amplitude of a beacon signal $B_{(i-1)T\_}i$ processed by the second signal processing circuitry 160 in the period of "t=(i−2)T to (i−1)T". The controller 180 calculates phase and amplitude differences between the two beacon signals (step S112).

Next, the controller 180 determines whether or not all of the switchers 130_2 to 130_N have been selected (ON). In other words, it is determined where or not "i" reaches "N" (step S113).

When it is determined that "i" does not reach "N", the controller 180 causes switching, at a time when the sampling time T has passed since a time when the switchers 130_2 to 130_N were last switched, in such a manner that only a next switcher 130_i becomes ON, and returns to step S111 (step S114).

When it is determined that "i" reaches "N", the controller 180 performs channel estimation, based on the acquired phase and amplitude differences between the beacon signals B_1 and the beacon signals B_2 to B_N (S115). Thus, the controller 180 determines the direction of the power receiver 500 that is a source of the beacon signals B.

Through the processing as described above, channel estimation can be performed by using only two signal processing circuitries that perform frequency conversion and A/D conversion, namely, the first signal processing circuitry 150 and the second signal processing circuitry 160.

Note that order in which a switcher 130 to become ON is selected is not limited to the above-described order, and may be arbitrary.

The controller 180 may perform channel estimation by using not all of the beacon signals B_2 to B_N. For example, when one or some of the RF signal processing circuitries 120_2 to 120_N corresponding to the comparison antenna elements do not normally operate due to a failure or the like, a beacon signal B or beacon signals B to be received by the one or some RF signal processing circuitries may be ignored.

Places of the switchers 130_2 to 130_N may be changed within a scope where the above-described operation can be performed. For example, the switchers 130_2 to 130_N may be placed between the respective antenna elements 110 and the respective RF signal processing circuitries 120.

As described above, according to the first configuration example of the first embodiment, by providing the first signal processing circuitry 150 and the second signal processing circuitry 160 that perform digital signal processing to observe a reference signal and a plurality of comparison signals at the same time, it is possible to implement a wireless power transfer apparatus that estimates a channel of the beacon signal B, for retrodirective transmission. Moreover, the wireless power transfer apparatus that estimates a channel of the beacon signal B for retrodirective transmission can be achieved at low costs, compared to related arts in which it is necessary to provide as many signal processing circuitries as the total number of a reference antenna element and comparison antenna elements.

Second Configuration Example (Reception Beamforming)

Figure 6:
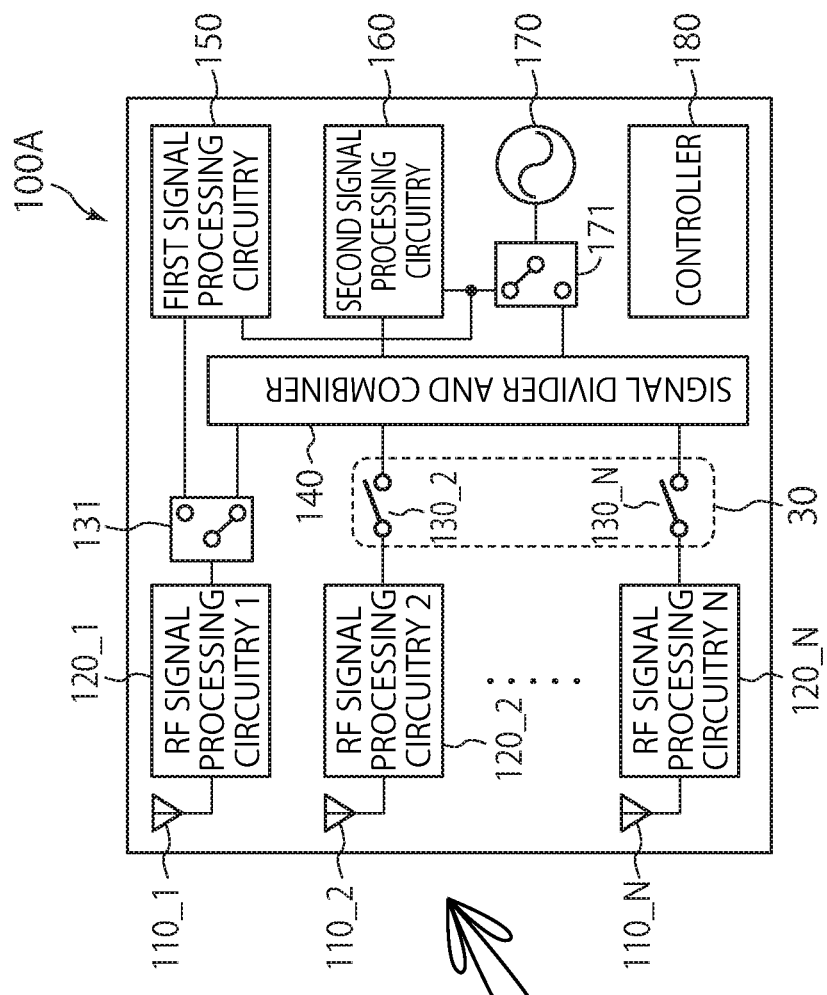
FIG. 6 is a block diagram of a wireless power transfer apparatus according to a second configuration example of the first embodiment.
Figure 6:
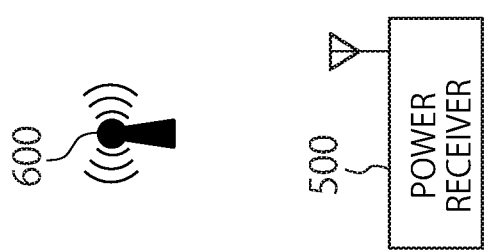
Figure 7:
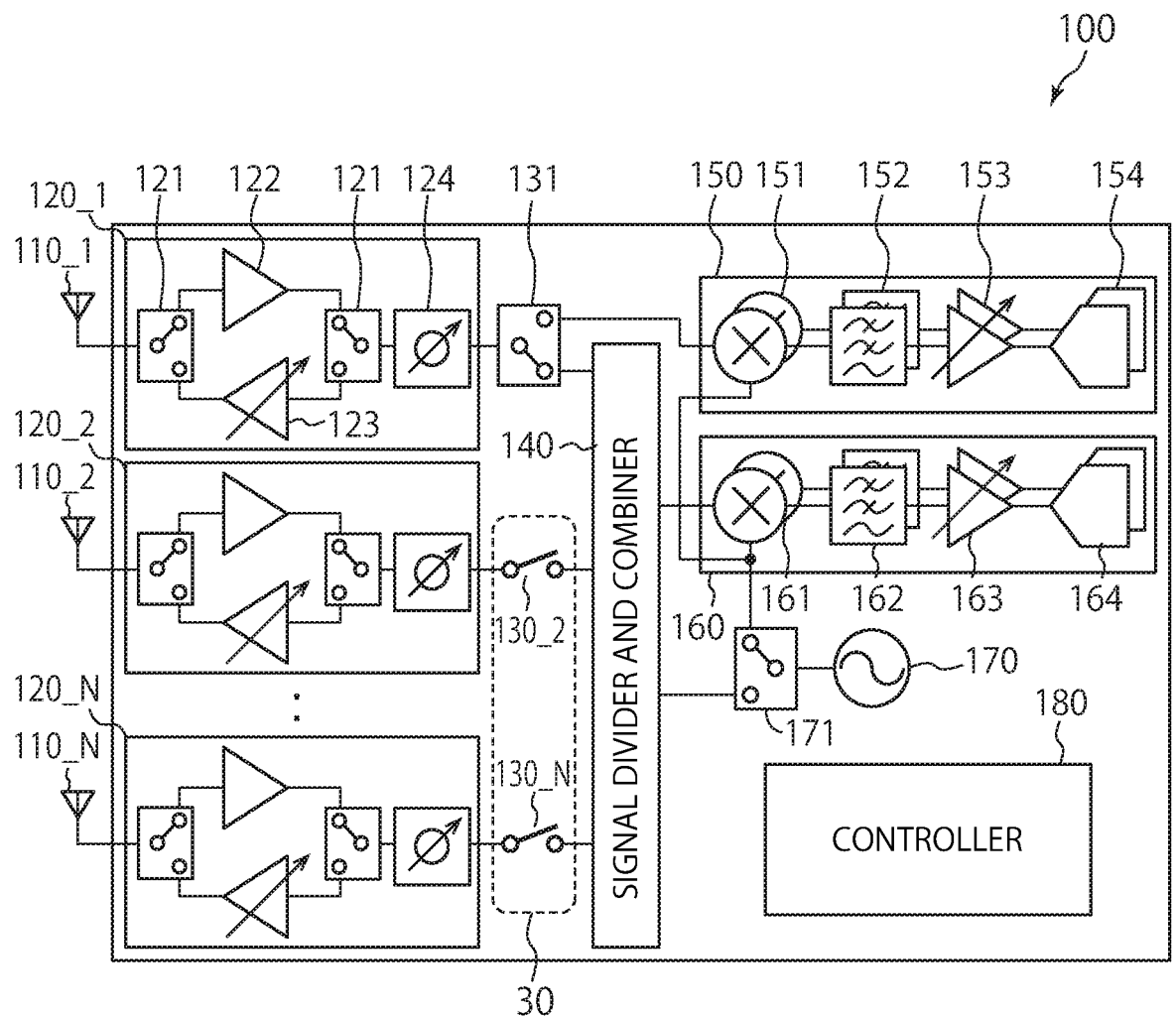
FIG. 7 is a block diagram showing a detailed configuration of the wireless power transfer apparatus according to the second configuration example of the first embodiment.

FIG. 6 is a block diagram of a wireless power transfer system including a wireless power transfer apparatus 100A and the power receiver 500, according to a second configuration example of the first embodiment. FIG. 7 is a detailed block diagram of the wireless power transfer apparatus 100A. Elements having the same names or the same functions as elements in FIG. 1 in the above-described first embodiment are denoted by the same signs. Hereinafter, description is omitted, except for a description of matters that are changed or added.

In the second configuration example, it is determined whether or not wireless equipment other than the power receiver 500 exists in the direction of the power receiver 500, by performing reception beamforming by using a result of channel estimation that is performed as in the first configuration example. Thus, before wireless power transfer to the power receiver 500 is performed, it is confirmed that no wireless equipment other than the power receiver 500 exists in a power transfer direction.

In FIGS. 6 and 7, the wireless power transfer apparatus 100A includes a switcher 131. The switcher 131 switches a connection destination of the RF signal processing circuitry 120_1 corresponding to the reference antenna element, between the first signal processing circuitry 150 and the signal divider and combiner 140. The wireless power transfer apparatus 100A includes a function of performing channel estimation, similarly to the wireless power transfer apparatus 100 in the first configuration example described above. While channel estimation is performed, the switcher 131 connects the RF signal processing circuitry 120_1 to the first signal processing circuitry 150. In other words, operation of a configuration in which the RF signal processing circuitry 120_1 is connected to the first signal processing circuitry 150 is similar to the operation of the wireless power transfer apparatus 100 according to the first configuration example.

The switcher 131 includes, for example, a switch and switches between ON for connection and OFF for disconnection by using the switch.

Wireless equipment 600 is wireless equipment that is not a power transfer target of the wireless power transfer apparatus 100A. The wireless equipment 600 is, for example, a base station of a wireless LAN (local area network) used in a factory, or a station corresponding to a slave device of such a base station, or the like. The wireless equipment 600 transmits and receives radio waves of a frequency close to that of radio waves for wireless power transfer (a power transfer signal R2, which will be described later) from the wireless power transfer apparatus 100A. Since harmful effects such as a communication failure are caused when the power transfer signal R2 is transmitted in a direction of the wireless equipment 600, the wireless power transfer apparatus 100A needs to avoid transmitting the power transfer signal R2 in the direction in which the wireless equipment 600 exists.

When determining whether or not the wireless equipment 600 exists in the direction of the power receiver 500, the wireless power transfer apparatus 100A performs reception analog beamforming (ABF) in order to enhance an S/N ratio for detection of the wireless equipment 600.

Reception ABF is a technique of enhancing an S/N ratio in reception of a radio-wave signal coming from a specific direction. Phase shift processing is performed on a reception signal received by each of a plurality of or all antenna elements, based on a position of the antenna element. In other words, a phase of each reception signal is adjusted, according to the position of each antenna element and the specific direction (the direction of the power receiver 500). After phase shift processing is performed on each reception signal, each reception signal is synthesized, whereby reception beamforming is accomplished. When each reception signal subjected to phase shift processing is synthesized, the radio-wave signals coming from the specific direction are in-phase and therefore intensify each other, while the radio-wave signals coming from directions different from the specific direction weaken each other. Thus, the S/N ratio in reception of the radio-wave signals coming from the specific direction, among the synthesized signals, can be enhanced. In reception ABF, unlike in channel estimation as described above, processing by the first antenna element 110_1 is not differentiated from processing by the second antenna elements 110_2 to 110_N.

Two or more, or all, of the switchers 130_2 to 130_N are caused to be ON. In the following description, a case is assumed in which all of the switchers 130_2 to 130_N are ON. The switcher 131 is switched to a signal divider and combiner 140 side. However, when the reference antenna element 110_1 is not used in reception ABF, the switcher 131 does not need to be switched to the signal divider and combiner 140 side.

Each transmission-reception change switch 121 in FIG. 7 is switched to the reception amplifier 122 side. A signal received by each antenna element 110 is amplified by the reception amplifier 122 included in each RF signal processing circuitry 120.

The phase shifter 124 of each RF signal processing circuitry 120 makes a phase shift in the signal amplified by the reception amplifier 122.

The controller 180 controls the amount of the phase shift made by each phase shifter 124 in such a manner that a reception beam R1 is directed in the estimated direction of the power receiver 500, as shown in FIG. 6.

The signal divider and combiner 140 includes a synthesizer that synthesizes reception signals. The signal divider and combiner 140 synthesizes each reception signal subjected to phase shift processing that is inputted from each RF signal processing circuitry 120, respectively. Thus, reception ABF is performed. The signal divider and combiner 140 outputs synthesized signals acquired by synthesizing each reception signal, to the second signal processing circuitry 160.

The second signal processing circuitry 160 performs frequency conversion and A/D conversion on the synthesized signals inputted from the signal divider and combiner 140. Note that the first signal processing circuitry 150 is not used in reception ABF.

The signal generator 170, as in channel estimation, generates an LO signal for frequency conversion. The switcher 171 connects the signal generator 170 and the second signal processing circuitry 160.

The controller 180 acquires digital reception signals (the synthesized signals subjected to reception ABF) processed by the second signal processing circuitry 160. Based on the acquired reception signals, the controller 180 determines whether or not the wireless equipment 600 is included in the direction of the power receiver 500. For example, it is determined whether or not a radio-wave signal transmitted from the wireless equipment 600 is included in the acquired reception signals. For example, when a signal with power of a threshold value or more is included in the acquired reception signals, it may be determined that a radio-wave signal transmitted from the wireless equipment 600 is included. Alternatively, when the controller 180 includes a circuit that is capable of interpreting a protocol of the wireless LAN, and when a frame for the wireless LAN is detected from the acquired reception signals, it may be determined that a radio-wave signal transmitted from the wireless equipment 600 is included. In the acquired reception signals, a radio-wave signal coming from the estimated direction of the power receiver 500 forms a large component. Accordingly, a degree of accuracy in detection of the wireless equipment 600 in the estimated direction of the power receiver 500 can be enhanced. The controller 180 may determine whether or not a radio-wave signal from the wireless equipment 600 is included, by using another method than the above-described method.

Figure 8:
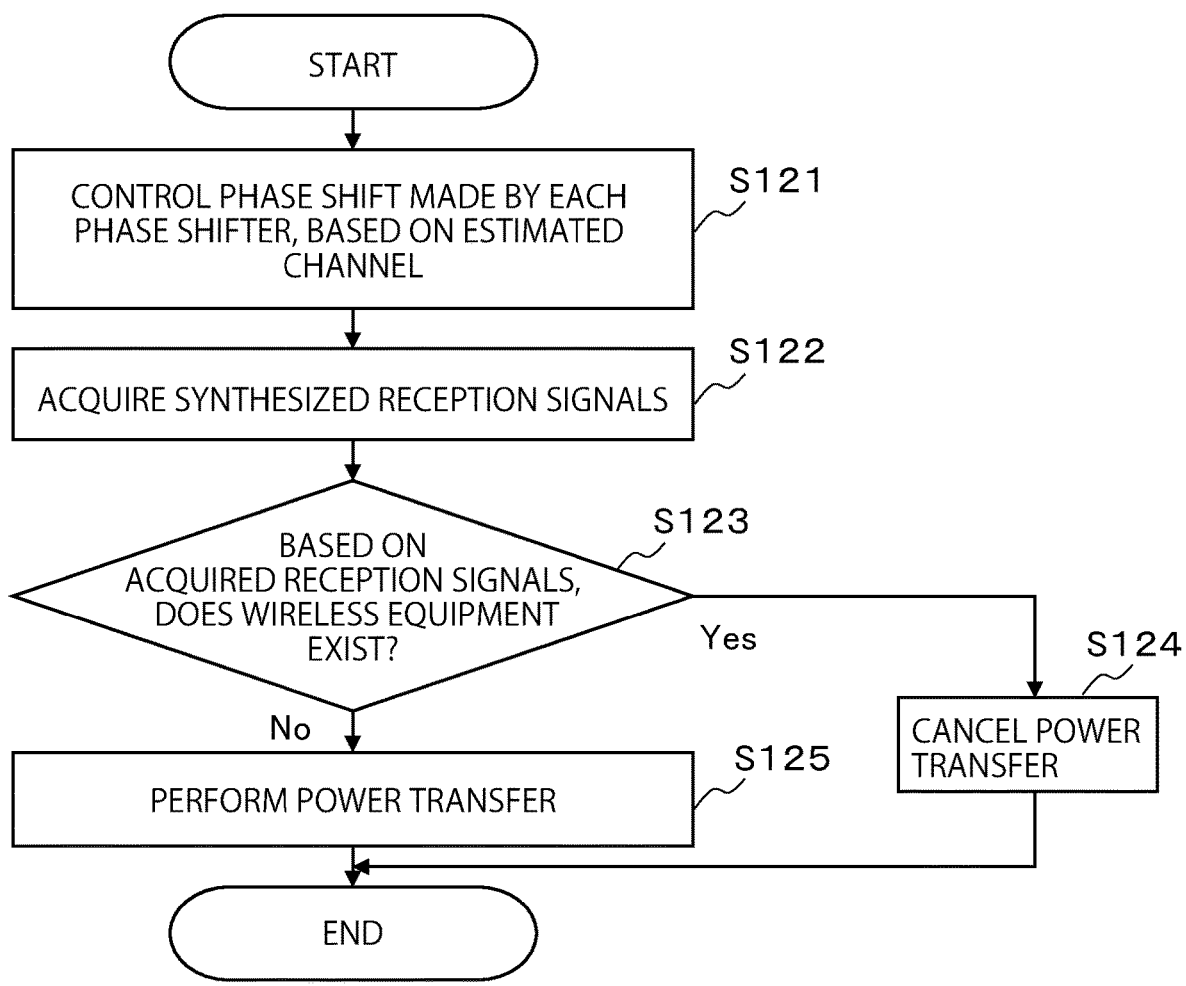
FIG. 8 is a flowchart of processing according to the second configuration example of the first embodiment.

FIG. 8 is a flowchart of processing performed by the wireless power transfer apparatus 100A in reception ABF.

First, based on a result of estimation of a channel of a beacon signal B, the controller 180 controls the amount of a phase shift made by the phase shifter 124 of the RF signal processing circuitry corresponding to each antenna element in such a manner that a reception beam R1 is directed toward the power receiver 500 (step S121).

Next, the controller 180 acquires digital reception signals (synthesized signals) synthesized by the signal divider and combiner 140 from the second signal processing circuitry 160 (step S122).

Next, based on the acquired reception signals, the controller 180 determines whether or not the wireless equipment 600 exists in the direction of the power receiver 500 (step S123).

When the controller 180 determines that the wireless equipment 600 exists in the direction of the power receiver 500, wireless power transfer is not performed (step S124). After step S124, the same sequence (steps S121 to S123)

may be started again, or phase control may be performed for reception beamforming based on a channel from a different power receiver.

When the controller 180 determines that the wireless equipment 600 does not exist in the direction of the power receiver 500, wireless power transfer is performed (step S125). Details of operation of performing wireless power transfer are described in description of another configuration example, which will be described later.

When the controller 180 determines to cancel wireless power transfer to the power receiver 500 in step S124, processing may be performed for enabling wireless power transfer to the power receiver 500 to be performed. For example, when the power receiver 500 is mounted in a mobile apparatus such as a vehicle, the controller 180 may transmit command data that orders the power receiver 500 or the apparatus to move in such a manner that the wireless equipment 600 is not positioned between the wireless power transfer apparatus 100A and the power receiver 500. A position to which the power receiver 500 moves may be determined by the wireless power transfer apparatus 100A. In such a case, the determined position may be included in the command data.

Alternatively, the controller 180 may transmit, to a wireless power transfer apparatus (not shown) at a different position, command data that orders the wireless power transfer apparatus to perform wireless power transfer to the power receiver 500.

As described above, according to the second configuration example of the first embodiment, it is possible to determine, with high accuracy, whether or not the wireless equipment 600 other than the power receiver 500 exists in the direction of the power receiver 500. Thus, since it is possible to avoid performing power transfer in a situation where the wireless equipment 600 exists in the direction of the power receiver 500, it is possible to prevent interference with communication of the wireless equipment 600.

Third Configuration Example (Human Detection)

Figure 9:
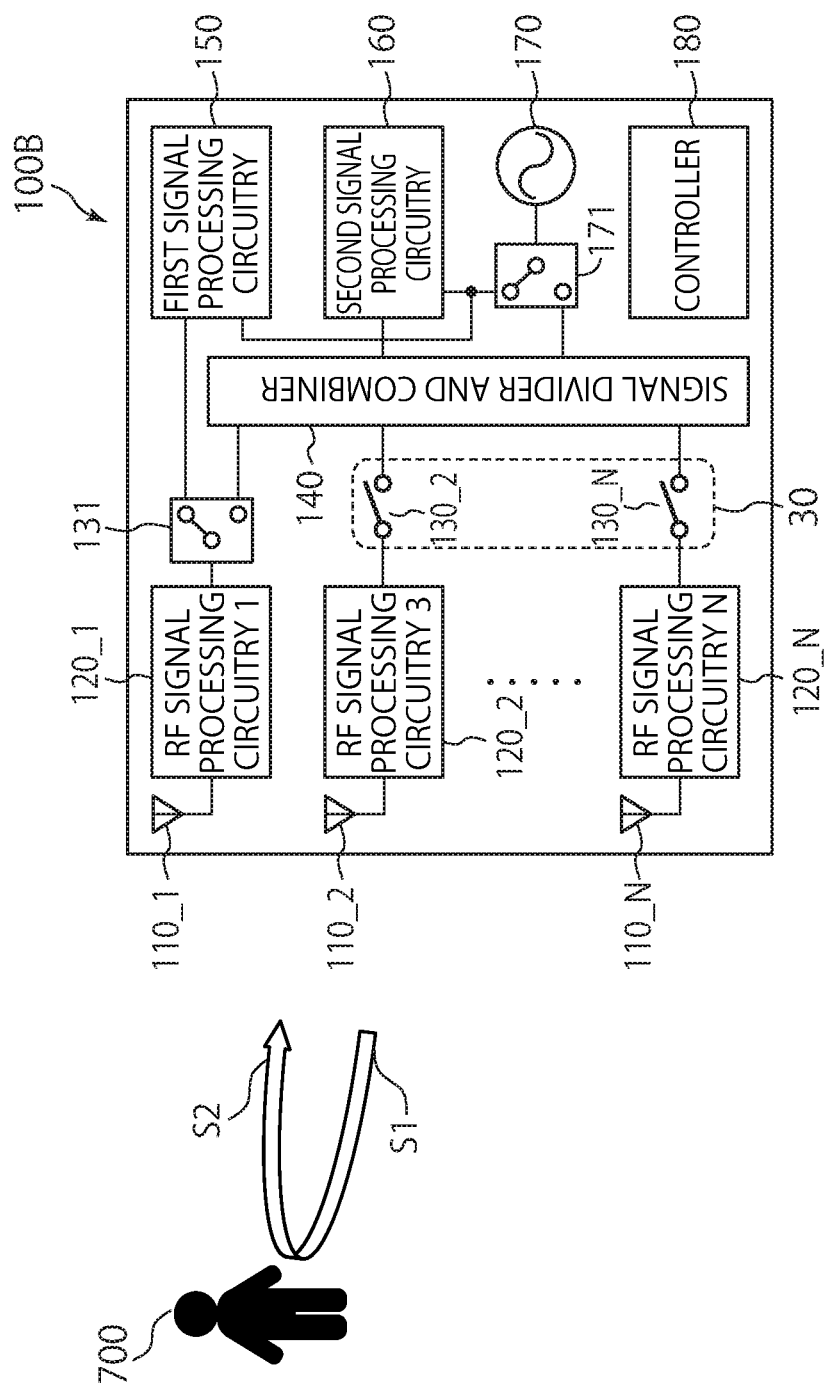
FIG. 9 is a block diagram of a wireless power transfer apparatus according to a third configuration example of the first embodiment.

FIG. 9 shows a wireless power transfer system including a wireless power transfer apparatus 100B, according to a third configuration example of the first embodiment. Depiction of a power receiver that is a power transfer target is omitted. A detailed block diagram of the wireless power transfer apparatus 100B is the same as FIG. 7. Elements having the same names or the same functions as elements in FIGS. 6 and 7 are denoted by the same signs. Hereinafter, description is omitted, except for a description of matters that are changed or added.

In the third configuration example, before wireless power transfer is performed, it is determined whether or not an object such as a human exists in the direction of the power receiver 500. Thus, before wireless power transfer is performed from the wireless power transfer apparatus 100B to the power receiver 500, it is confirmed that an object such as a human does not exist in a power transfer direction.

The wireless power transfer apparatus 100B includes the functions of the wireless power transfer apparatus according to the first and second configuration examples described above, and further determines whether or not an object (a human 700 in the present example) to avoid exists within a range where the wireless power transfer apparatus 100B performs wireless power transfer. Wireless power transfer is not performed when the human 700 exists, and wireless power transfer is performed when the human 700 does not exist. The object is not limited to a human, and may be, for example, a mobile object such as an automatic guided vehicle, or a stationary object such as a wall or a pole. Hereinafter, although a case is described in which the object is the human 700, the object is not limited to a human.

In human detection, after a faint radio-wave signal S1 (detection signal) is transmitted from the wireless power transfer apparatus 100B, signals S2 reflected by objects including the human 700 are received, and presence or absence of the human 700 is determined based on the reflected signals S2. For example, presence or absence of the human 700 is determined, based on whether or not vibrations specific to a human (shakes of a human, heartbeats, or the like) are included in the reception signals. Alternatively, amplitudes of each reflected signal S2 and the transmitted detection signal S1 may be compared, and a human may be detected when attenuation is between a lower-limit value and an upper-limit value, inclusive. At the time, the antenna elements 110_2 to 110_N are used for transmission antenna elements, and the antenna element 110_1 is used for a reception antenna element.

The transmission-reception change switches 121 (see FIG. 7) for the antenna elements 110_2 to 110_N are switched to the transmission variable amplifier 123 side, and the transmission-reception change switch 121 for the antenna element 110_1 is switched to the reception amplifier 122 side. The switcher 131 is switched to a first signal processing circuitry 150 side.

In human detection, the signal generator 170 outputs a local oscillator signal as a detection signal to the signal divider and combiner 140. At the time, the switcher 171 connects the signal generator 170 and the signal divider and combiner 140.

After the detection signal S1 is outputted from the signal generator 170 to the signal divider and combiner 140, the switcher 171 is switched such as to connect the signal generator 170 and the first signal processing circuitry 150.

The detection signal from the signal generator 170 is distributed by the signal divider and combiner 140 to the RF signal processing circuitries 120_2 to 120_N in turn, and is transmitted as the detection signal S1 from one of the antenna elements 110_2 to 110_N in turn. The detection signal S1 is, for example, a microwave signal.

The switcher 171 corresponds to a first switcher that selectively switches between feeding the local oscillator signal to the first signal processing circuitry 150 and the second signal processing circuitry 160, and feeding the local oscillator signal as the detection signal to two or more RF signal processing circuitries (second wireless signal processing circuitries).

The magnitude of the detection signal S1 transmitted from each antenna element 110 is as small as meets a human protection guideline. For example, for the detection signal S1 transmitted from each antenna element 110, an effective value of electric field strength is equal to or less than 137 V/m, an effective value of magnetic field strength is equal to or less than 0.365 A/m, or power flux density is equal to or less than 5 mW/cm$^2$.

The detection signals S1 transmitted from the antenna elements 110 do not have directionality by beamforming (that is, depend on antenna directivity of each one antenna element), and propagate from the wireless power transfer apparatus 100B in directions including a direction in which the human 700 (object) exists.

Part of the detection signal S1 transmitted by an antenna element 110 (here, one of the antenna elements 110_2 to 110_N) is reflected by the human 700, and is received, as a reflected signal S2, by the antenna element 110_1.

The reflected signal S2 received by the antenna element 110_1 is processed by the RF signal processing circuitry 120_1 to be an analog reception signal, which is then subjected to frequency conversion, conversion to a digital signal, and the like by the first signal processing circuitry 150.

Although a signal source of the detection signal S1 is the same as a signal source of the LO signal for frequency conversion (signal generator 170) in the present configuration example, the signal source of the detection signal S1 and the signal source of the LO signal may be prepared separately.

The controller 180 acquires a reception signal that is the reflected signal S2 processed by the first signal processing circuitry 150, for each detection signal S1 transmitted from each different antenna element. Based on the reception signals, the controller 180 determines whether or not a human exists in a direction including the direction of the power receiver 500. The controller 180 may detect a position or a direction of the human, and may further estimate a channel from the human.

Figure 10:
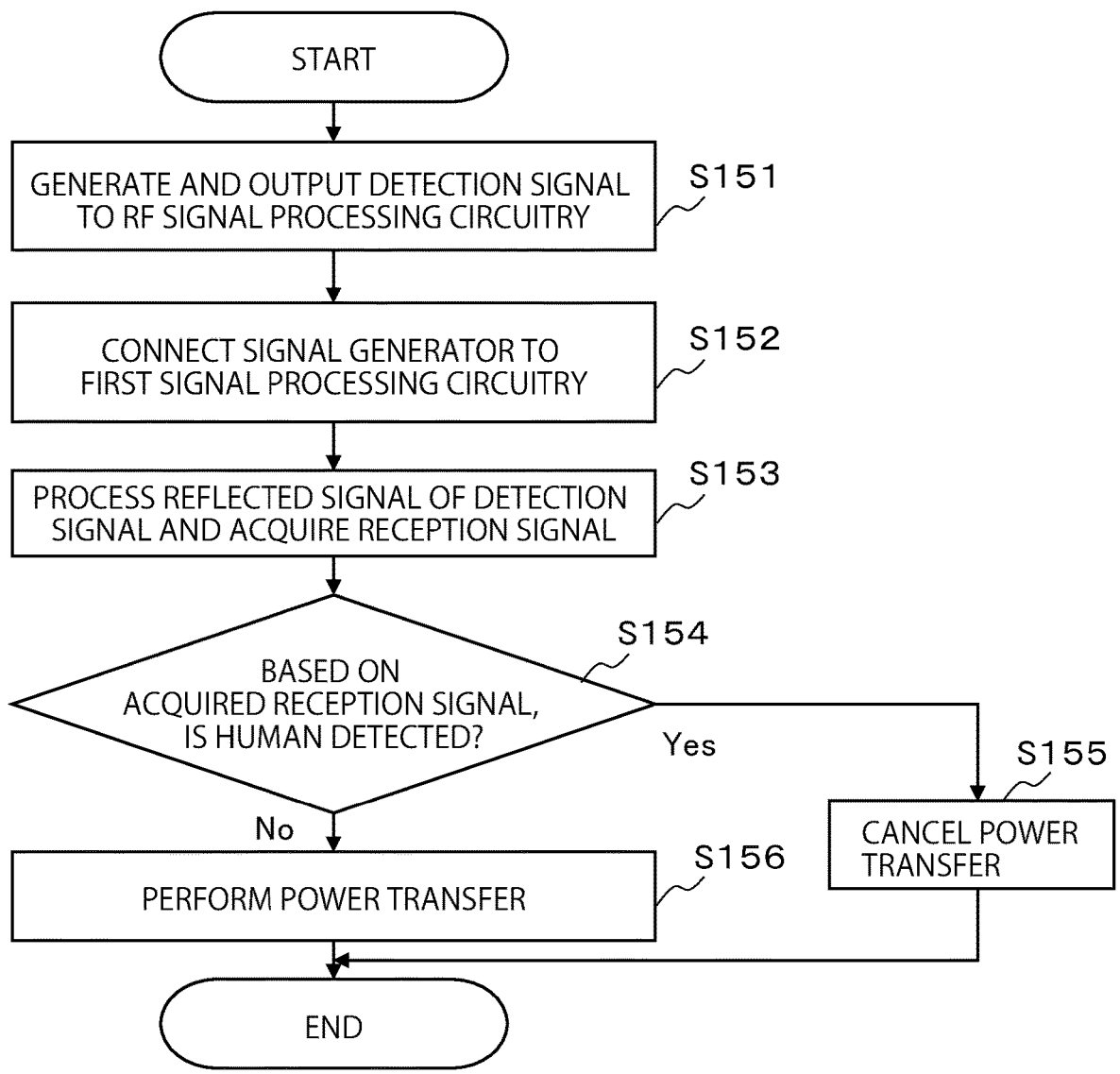
FIG. 10 is a flowchart of processing according to the third configuration example of the first embodiment.

FIG. 10 is a flowchart of processing performed by the wireless power transfer apparatus 100B in human detection.

First, the controller 180 connects the signal generator 170 to the signal divider and combiner 140 side, and causes one of the switchers 130_2 to 130_N to be ON (connects the signal generator 170 to one of the antenna elements 110_2 to 110_N). A local oscillator signal is outputted as a detection signal from the signal generator 170, and the detection signal S1 is transmitted from an antenna element via a selected RF signal processing circuitry (step S151).

Next, the controller 180 connects the switcher 171 for the signal generator 170 to the first signal processing circuitry 150 side (step S152).

Next, the RF signal processing circuitry 1 receives a reflected signal S2 of the detection signal S1 via the antenna element 110_1, processes the reflected signal S2, and acquires a reception signal (step S153). The first signal processing circuitry 150 processes the reception signal and acquires a digital reception signal, which is then provided to the controller 180 (same step S153).

By repeating steps S151 to S153, transmission of a detection signal S1 is performed with respect to each of the antenna elements 110_2 to 110_N in turn. For example, transmission of a detection signal S1 is performed from each of the RF signal processing circuitries 120_2 to 120_N in turn.

Next, based on each reception signal, the controller 180 performs human detection. When a human is detected, a position or a direction of the human may be further detected. Moreover, a channel from the human may also be detected (step S154).

When it is determined that the human 700 exists, the controller 180 cancels wireless power transfer in order to avoid wireless power transfer (transmission of a power transfer signal R2) to the human 700 (step S155).

When it is determined that the human 700 does not exist, the controller 180 determines absence of the human 700, and performs wireless power transfer (step S156).

In step S155, the controller 180 may choose to perform other processing than canceling wireless power transfer. For example, transmission of a power transfer signal (see the power transfer signal R2 in FIG. 11, which will be described later) to the human 700 may be avoided by performing processing such as generating a null in a direction in which the human 700 exists. At the time, the magnitude of the power transfer signal transmitted to the human 700 is as small as meets the human protection guideline. For example, the controller 180 may generate a null in a direction including a direction of the human 700 in such a manner that for the power transfer signal transmitted to the human 700, an effective value of electric field strength becomes equal to or less than 137 V/m, an effective value of magnetic field strength becomes equal to or less than 0.365 A/m, or power flux density becomes equal to or less than 5 mW/cm$^2$.

After wireless power transfer is cancelled, the controller 180 may issue, to the human 700, an instruction to move. The instruction to move may be issued in any form as long as the instruction is information that is recognizable to the human 700. For example, a warning tone, lighting up, display of a message in a screen of a terminal held by the human 700, or the like may be used. Thereafter, the controller 180 may perform wireless power transfer after confirming that the human 700 goes out of a target range for human detection.

The controller 180 may perform calibration for human detection, by performing the above-described processing (processing in the flowchart of FIG. 10) on an object other than the human 700 (an environment where the human 700 does not exist).

As described above, according to the third configuration example of the first embodiment, since presence or absence of the human 700 can be determined, it is possible to avoid exposing the human 700 to the power transfer signal, and to perform wireless power transfer safely.

Fourth Configuration Example (Wireless Power Transfer)

Figure 11:
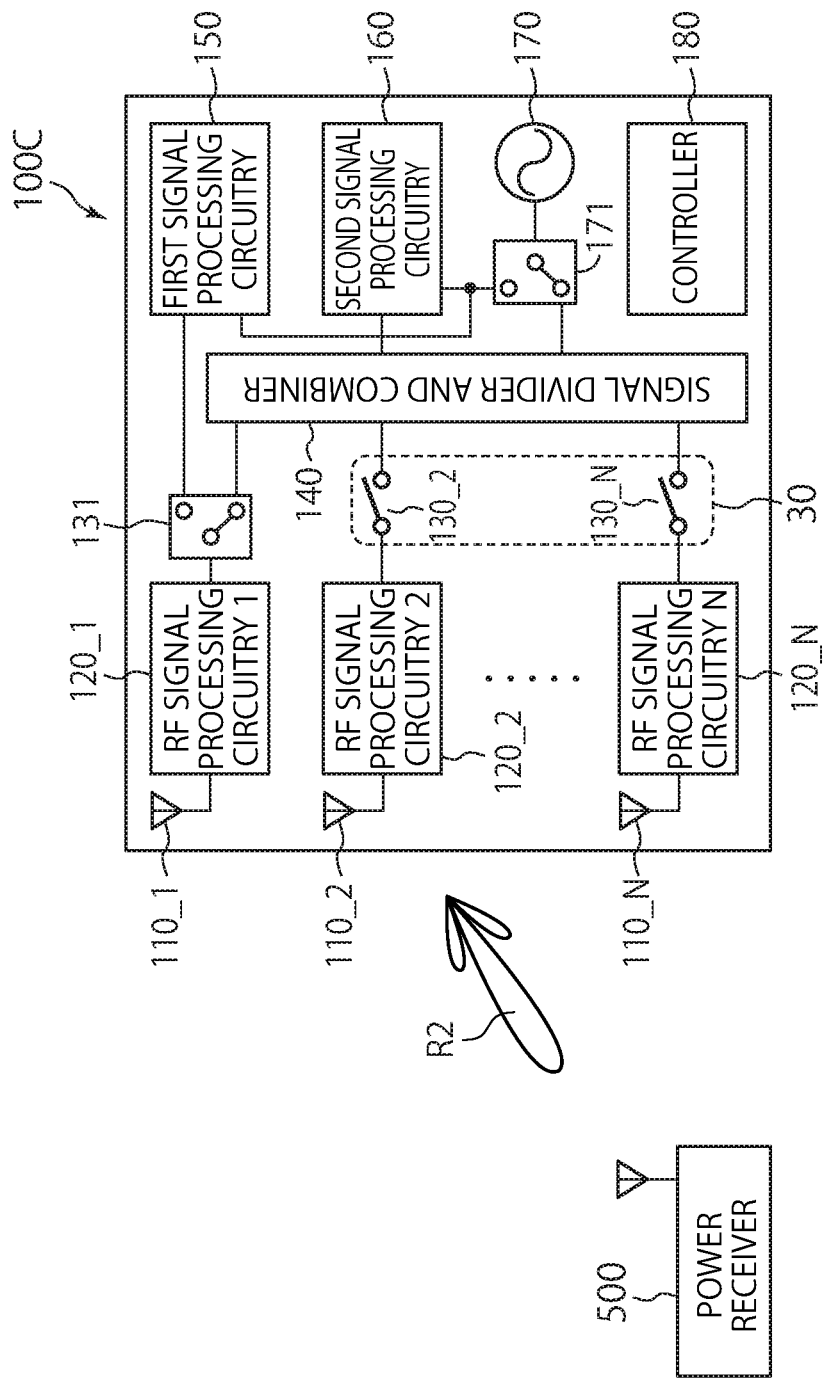
FIG. 11 is a block diagram of a wireless power transfer apparatus according to a fourth configuration example of the first embodiment.

FIG. 11 shows a wireless power transfer system including a wireless power transfer apparatus 100C and the power receiver 500, according to a fourth configuration example of the first embodiment. A detailed block diagram of the wireless power transfer apparatus 100C is the same as FIG. 7. Elements having the same names or the same functions as elements in FIG. 1, 6, or 9 in the above-described first embodiment are denoted by the same signs. Hereinafter, description is omitted, except for a description of matters that are changed or added.

The wireless power transfer apparatus 100C includes the functions of the wireless power transfer apparatus according to the first to third configuration examples described above, and further includes a function of performing wireless power transfer to the power receiver 500 through transmission beamforming. In other words, in wireless power transfer, the wireless power transfer apparatus 100C forms a transmission beam of power transfer signals R2 by performing transmission beamforming. The power transfer signal R2 is, for example, a microwave signal.

In wireless power transfer, under control of the controller 180, a local oscillator signal generated by the signal generator 170 is used for a power transfer signal. At the time, the switcher 171 is connected to the signal divider and combiner 140 side, and the generated power transfer signal is distributed by the signal divider and combiner 140 to each of the respective RF signal processing circuitries 120_1 to 120_N corresponding to the antenna elements 110_1 to 110_N. In wireless power transfer, processing by the first antenna element 110_1 and processing by the second antenna elements 110_2 to 110_N are not differentiated.

The switcher 171 corresponds to a second switcher that selectively switches between feeding the local oscillator signal to the first signal processing circuitry 150 and the second signal processing circuitry 160, and feeding the local oscillator signal as the power transfer signal to at least two RF signal processing circuitries (wireless signal processing circuitries).

Two or more, or all, of the switchers 130_2 to 130_N are caused to be ON. In the following description, a case is assumed in which all of the switchers 130_2 to 130_N are ON. The switcher 131 is switched to the signal divider and combiner 140 side. However, when the antenna element 110_1 is not used in transmission beamforming, the switcher 131 does not need to be switched to the signal divider and combiner 140 side.

The distributed power transfer signal is phase-controlled by the phase shifter 124 in each RF signal processing circuitry 120.

At the time, as in the above-described reception beamforming, the controller 180 controls the amount of a phase shift made by each phase shifter 124 in such a manner that a transmission beam R2 is directed in a direction including the estimated direction of the power receiver 500, as shown in FIG. 11.

Each power transfer signal after the amount of the phase shift is controlled by each phase shifter 124 is amplitude-controlled by the transmission variable amplifier 123 in each RF signal processing circuitry 120, and then transmitted to the plurality of antenna elements 110 (110_1 to 110_N), respectively. The power transfer signals R2 are emitted from the plurality of antenna elements 110, and a transmission beam of the power transfer signals R2 is formed toward the power receiver 500.

As described above, according to the fourth configuration example of the first embodiment, it is possible to perform wireless power transfer with high efficiency, through beam transmission to the power receiver 500.

Figure 12:
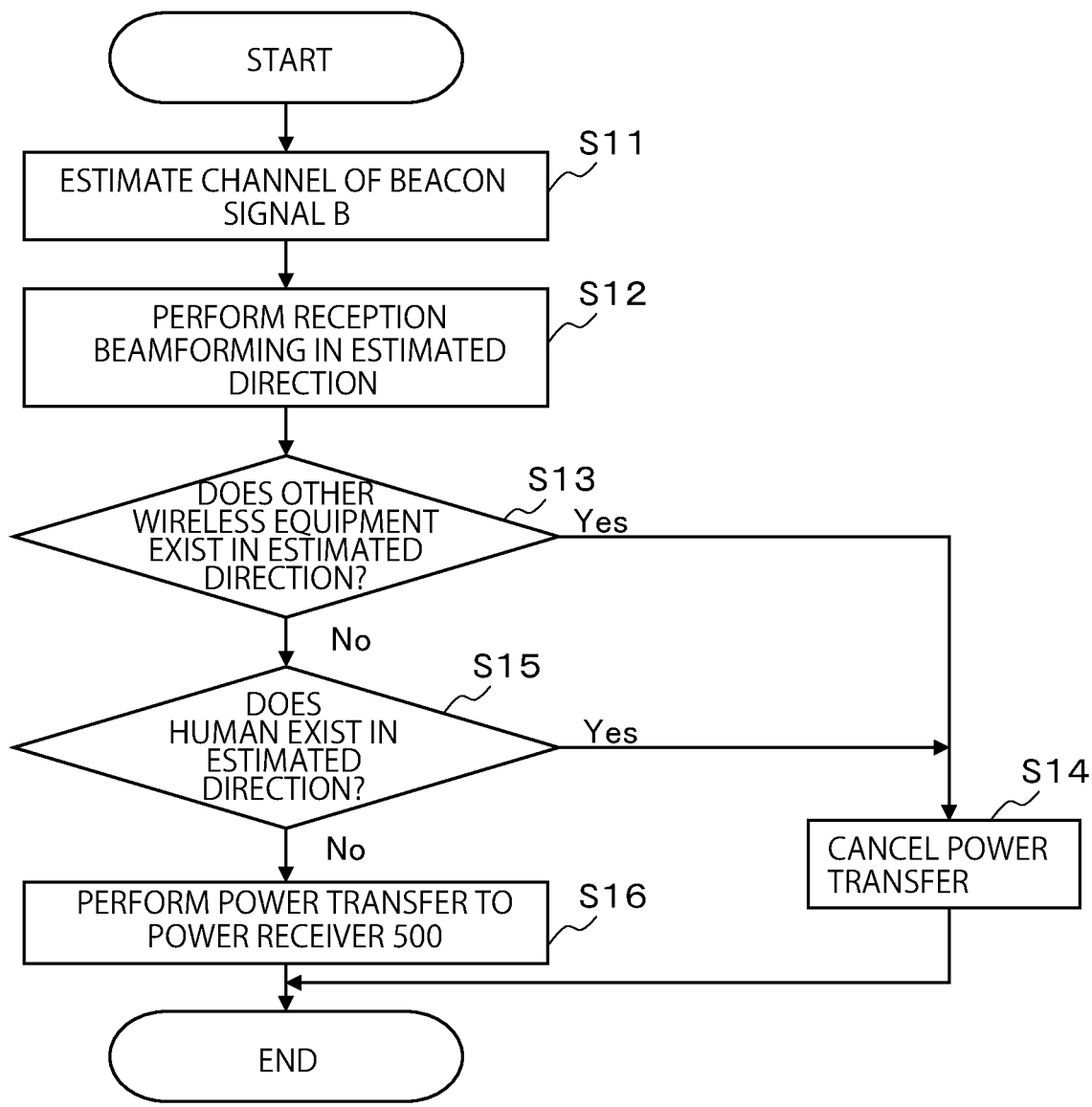
FIG. 12 is a flowchart of processing according to the first embodiment.

FIG. 12 is a flowchart that describes a sequential flow of processing performed by the wireless power transfer apparatus 100C, according to the first embodiment.

First, the controller 180 performs estimation of a channel of a beacon signal B, based on phases and amplitudes of beacon signals B_1 to B_N, and estimates or determines a direction of a source of the beacon signal B (power receiver 500) (step S11).

Next, the controller 180 performs reception beamforming in the direction estimated in step S11 (step S12).

Next, based on a signal received in reception beamforming, the controller 180 determines whether or not the wireless equipment 600, other than the power receiver 500 that is a power transfer target, exists in the estimated direction (step S13).

When it is determined that the wireless equipment 600 other than the power receiver 500 exists in the estimated direction, the controller 180 does not perform wireless power transfer, in order to avoid interference with communication of the wireless equipment 600 (step S14).

When it is determined that the wireless equipment 600 does not exist in the estimated direction, the controller 180 determines whether or not the human 700 exists in the direction estimated in step S11 (step S15).

When it is determined that the human 700 exists in the estimated direction, the controller 180 does not perform wireless power transfer, in order to avoid harmful effects on the human 700 (step S14).

When it is determined that the human 700 does not exist in the estimated direction, the controller 180 performs wireless power transfer, that is, transmits a power transfer signal R2 (step S16).

Order in which steps S12 to S13 and step S15 are performed may be arbitrary. In other words, it may be determined whether or not the wireless equipment 600 exists after it is confirmed that the human 700 does not exist in the estimated direction.

As described above, according to the first embodiment, channel estimation for retrodirective transmission can be performed by using only the two signal processing circuitries 150, 160 for signal processing circuitries including AD conversion. Accordingly, a configuration can be simplified, and lower costs can be achieved. In addition, reception beamforming, human detection, and the like can be performed, so that coexistence with other wireless equipment and protection of a human can be accomplished.

Second Embodiment

In the first embodiment, one predetermined antenna element is used for the first antenna element (reference antenna element). The antenna element serving as the first antenna element is fixed and cannot be changed. Accordingly, if the first antenna element or the RF signal processing circuitry corresponding to the first antenna element is unable to be used due to failure or the like, channel estimation, human detection, and the like cannot be performed. In contrast, in a second embodiment, it is made possible to change an antenna element serving as the first antenna element.

Figure 13:
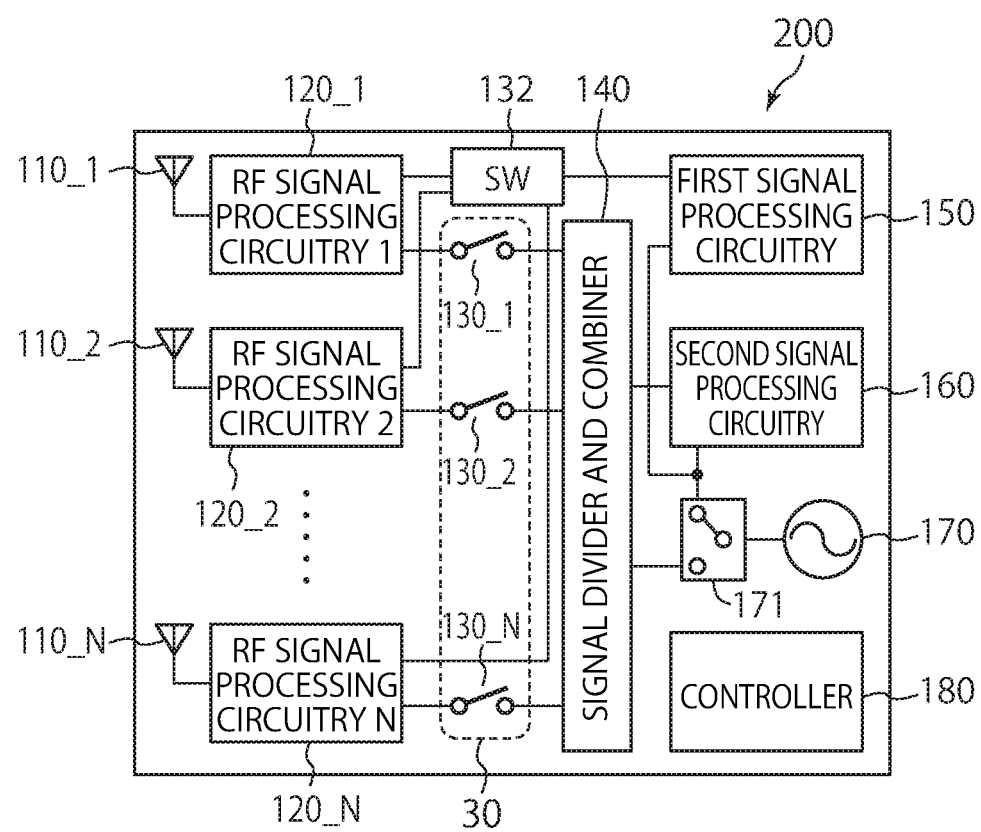
FIG. 13 is a block diagram of a wireless power transfer apparatus according to a second embodiment.

FIG. 13 shows a wireless power transfer system including a wireless power transfer apparatus 200, according to the second embodiment. Depiction of a power receiver that is a power transfer target is omitted. A detailed block diagram of the wireless power transfer apparatus 200 is the same as FIG. 7. Elements having the same names or the same functions as elements in FIG. 1, 6, 9, or 11 in the first embodiment described above are denoted by the same signs. Hereinafter, description is omitted, except for a description of matters that are changed or added.

The wireless power transfer apparatus 200 includes a switcher 130_1 and a switcher 132 (second selector).

The switcher 130_1 switches between ON for connection and OFF for disconnection between the RF signal processing circuitry 1 and the signal divider and combiner 140. The switcher 130_1 includes a function similar to those of the switchers 130_2 to 130_N. The selector 30 (first selector) includes the switchers 130_1 to 130_N.

The switcher 132 switches between ON for connection and OFF for disconnection between the RF signal processing circuitries 1 to N and the first signal processing circuitry 150. The switcher 132 is a selector (second selector) that selects one RF signal processing circuitry and connects the selected RF signal processing circuitry and the first signal processing circuitry 150. The then selected RF signal processing circuitry serves as the first wireless signal processing circuitry. The RF signal processing circuitries that are not selected serve as the second wireless signal processing circuitries.

The controller 180 controls the switchers 130_1 to 130_N in such a manner that the RF signal processing circuitry selected by the switcher 132 is not connected to the signal divider and combiner 140. For example, when the switcher 132 connects the RF signal processing circuitry 120_1 and the first signal processing circuitry 150, the switcher 130_1 is caused to be OFF, and all, or one or some, of the switchers 130_2 to 130_N are caused to be ON.

The switcher 132 is, for example, a switch circuit including a plurality of switches, and switches between ON for connection and OFF for disconnection by using the switches. Processing by the switcher 132 may be performed by an electric circuit, or may be performed by using a program. The switcher 132 or the controller 180 may include a function of temporarily turning off a power supply of an RF signal processing circuitry that is not used by the first signal processing circuitry 150 or the second signal processing circuitry 160. In such a case, the switcher 132 or the controller 180 may be a device such as a computer.

Thus, an arbitrary antenna element among the plurality of antenna elements can be used for the first antenna element. Moreover, in the second embodiment, as in the first embodiment, wireless power transfer through channel estimation, reception beamforming, human detection, and transmission beamforming can also be performed.

As described above, according to the second embodiment, an arbitrary antenna element can be used for the first antenna element. Accordingly, even if an RF signal processing circuitry corresponding to some antenna element that is used for the first antenna element is unable to be used due to failure or the like, channel estimation, human detection, and the like can be performed by assigning an antenna element corresponding to a normal RF signal processing circuitry as a new first antenna element. Moreover, even if an antenna element itself that is used for the first antenna element is unable to be used due to a breakage or the like, channel estimation, human detection, and the like can be performed by assigning a normal antenna element as a new first antenna element.

The embodiments as described before may be configured as below.

Clauses

Clause 1. A wireless power transfer apparatus that is capable of wireless power transfer to a power receiver that transmits a wireless signal, comprising:
  N antenna elements;
  N wireless signal processing circuitries configured to acquire analog signals, based on wireless signals received by the N antenna elements;
  a first signal processing circuitry configured to acquire a first digital signal, based on a first analog signal that is the analog signal acquired by a first wireless signal processing circuitry among the N wireless signal processing circuitries;
  a first selector configured to select one of second analog signals that are the analog signals acquired by (N−1) second wireless signal processing circuitries different from the first wireless signal processing circuitry among the N wireless signal processing circuitries;
  a second signal processing circuitry configured to acquire a second digital signal, based on the second analog signal selected by the first selector; and
  a controller configured to estimate a channel from the power receiver, based on the first digital signal and the second digital signal.

Clause 2. The wireless power transfer apparatus according to clause 1, wherein the first selector includes a plurality of switches configured to connect the (N−1) second wireless signal processing circuitries to the second signal processing circuitry.

Clause 3. The wireless power transfer apparatus according to clause 1 or 2, wherein
  the first selector is configured to select one of the plurality of second analog signals in turn, according to a plurality of times, and
  the controller is configured to estimate the channel from the power receiver, based on the second digital signal acquired from the second analog signal selected at each of the times, and the first digital signal acquired from the corresponding first analog signal at each of the times.

Clause 4. The wireless power transfer apparatus according to any one of clauses 1 to 3, wherein
  the first digital signal includes information on an amplitude and a phase of the wireless signal inputted into the first wireless signal processing circuitry,
  the second digital signal includes information on an amplitude and a phase of the wireless signal inputted into the second wireless signal processing circuitry, and
  the controller is configured to estimate the channel, based on a difference in the phase, or a difference in the amplitude and a difference in the phase, between the first digital signal and the second digital signal.

Clause 5. The wireless power transfer apparatus according to clause 3, wherein
  the N wireless signal processing circuitries each include a phase shifter configured to make a phase shift in the wireless signal,
  the controller is configured to control, based on information on the channel, an amount of the phase shift made by each of the phase shifters in at least two wireless signal processing circuitries, among the phase shifters in the N wireless signal processing circuitries, and
  the wireless power transfer apparatus further comprises a synthesizer configured to synthesize the analog signals acquired by the at least two wireless signal processing circuitries.

Clause 6. The wireless power transfer apparatus according to clause 5, wherein the controller is configured to determine, based on the synthesized signals acquired by the synthesizer synthesizing the analog signals, whether or not wireless equipment different from the power receiver exists in a direction including a direction of the power receiver.

Clause 7. The wireless power transfer apparatus according to clause 6, wherein
  the controller is configured to determine not to perform the wireless power transfer to the power receiver when the wireless equipment is included in the direction including the direction of the power receiver, and
  the controller is configured to determine to perform the wireless power transfer to the power receiver when the wireless equipment is not included in the direction including the direction of the power receiver.

Clause 8. The wireless power transfer apparatus according to any one of clauses 1 to 7, further comprising a signal generator configured to generate a detection signal for detecting an object, wherein
  the first wireless signal processing circuitry is configured to acquire the first analog signal, based on the wireless signal received by a first antenna element among the N antenna elements,
  the (N−1) second wireless signal processing circuitries are configured to acquire the second analog signals, based on the wireless signals received by second to N-th antenna elements among the N antenna elements,
  two or more of the (N−1) second wireless signal processing circuitries are configured to transmit the detection signal from the signal generator from the respective corresponding antenna elements,
  the first wireless signal processing circuitry is configured to acquire a plurality of reception signals, based on reflected signals of the plurality of detection signals, the reflected signals received via the first antenna element, and the wireless power transfer apparatus comprises a controller configured to detect at least one of a position and a direction of an object existing in a power transfer area, based on a plurality of digital signals acquired by the first signal processing circuitry based on the plurality of reception signals.

Clause 9. The wireless power transfer apparatus according to claim 8, wherein the controller is configured to control the wireless power transfer to the power receiver, based on the detected at least one of the position and the direction of the object.

Clause 10. The wireless power transfer apparatus according to clause 8 or 9, wherein
the object is a human, and
for the detection signal, an effective value of electric field strength is equal to or less than 137 V/m, an effective value of magnetic field strength is equal to or less than 0.365 A/m, or power flux density is equal to or less than 5 mW/cm$^2$.

Clause 11. The wireless power transfer apparatus according to any one of clauses 8 to 10, wherein
the controller is configured to determine not to perform the wireless power transfer when the object is included in a direction including a direction of the power receiver, and
the controller is configured to determine to perform the wireless power transfer when the object is not included in the direction including the direction of the power receiver.

Clause 12. The wireless power transfer apparatus according to any one of clauses 8 to 11, wherein when the object is included in a direction including a direction of the power receiver, the controller is configured to generate a null in the direction in which the object exists, and to perform the wireless power transfer to the power receiver.

Clause 13. The wireless power transfer apparatus according to clause 12, wherein
the object is a human, and
the controller is configured to generate the null in such a manner that for radio waves to which the human is exposed, an effective value of electric field strength becomes equal to or less than 137 V/m, an effective value of magnetic field strength becomes equal to or less than 0.365 A/m, or power flux density becomes equal to or less than 5 mW/cm$^2$.

Clause 14. The wireless power transfer apparatus according to any one of clauses 8 to 13, wherein
the detection signal is an oscillator signal,
the wireless power transfer apparatus further comprises a first switcher configured to selectively switch between feeding the oscillator signal to the first signal processing circuitry and the second signal processing circuitry, and feeding the oscillator signal as the detection signal to two or more of the second wireless signal processing circuitries,
the first signal processing circuitry includes a first mixer configured to convert a frequency of the first analog signal, based on the oscillator signal, and
the second signal processing circuitry includes a second mixer configured to convert a frequency of the second analog signal, based on the oscillator signal.

Clause 15. The wireless power transfer apparatus according to any one of clauses 1 to 14, further comprising a signal generator configured to generate a power transfer signal, wherein the N wireless signal processing circuitries each include a phase shifter configured to make a phase shift in the power transfer signal,
the controller is configured to control an amount of the phase shift made by the phase shifter in each of at least two wireless signal processing circuitries among the N wireless signal processing circuitries, based on information on the channel, and
the wireless power transfer is performed by transmitting the power transfer signals in which the phase shifts are made by the phase shifters in the at least two wireless signal processing circuitries, from the respective corresponding antenna elements.

Clause 16. The wireless power transfer apparatus according to clause 15, wherein
the power transfer signal is an oscillator signal,
the wireless power transfer apparatus further comprises a second switcher configured to selectively switch between feeding the oscillator signal to the first signal processing circuitry and the second signal processing circuitry, and feeding the oscillator signal as the power transfer signal to the at least two wireless signal processing circuitries,
the first signal processing circuitry includes a first mixer configured to convert a frequency of the first analog signal, based on the oscillator signal, and
the second signal processing circuitry includes a second mixer configured to convert a frequency of the second analog signal, based on the oscillator signal.

Clause 17. The wireless power transfer apparatus according to any one of clauses 1 to 16, further comprising a second selector configured to select one of the N wireless signal processing circuitries, wherein
the selected wireless signal processing circuitry is the first wireless signal processing circuitry, and
the other (N−1) wireless signal processing circuitries than the selected wireless signal processing circuitry are the (N−1) second wireless signal processing circuitries.

Clause 18. The wireless power transfer apparatus according to clause 17, wherein the second selector includes a switch circuit configured to selectively connect the N wireless signal processing circuitries to the first signal processing circuitry.

Clause 19. The wireless power transfer apparatus according to any one of clauses 1 to 18, wherein the wireless signal transmitted from the power receiver is a beacon signal.

Clause 20. A method performed by a wireless power transfer apparatus that is capable of wireless power transfer to a power receiver that transmits a wireless signal, comprising:
acquiring a first analog signal based on a first wireless signal received by a first antenna element among N antenna elements;
acquiring a first digital signal based on the first analog signal;
acquiring a plurality of second analog signals based on second wireless signals received by (N−1) second antenna elements;
selecting one of the second analog signals;
acquiring a second digital signal based on the selected second analog signal; and
estimating a channel from the power receiver, based on the first digital signal and the second digital signal.

The invention claimed is:
1. An electronic apparatus that is capable of wireless power transfer to a power receiver that transmits a wireless signal, comprising:

N antenna elements (N is a natural number greater than or equal to 3);

N wireless signal processing circuitries configured to acquire analog signals, based on wireless signals received by the N antenna elements;

a first signal processing circuitry configured to acquire a first digital signal, based on a first analog signal that is the analog signal acquired by a first wireless signal processing circuitry among the N wireless signal processing circuitries;

a first selector configured to select one of second analog signals that are the analog signals acquired by (N−1) second wireless signal processing circuitries different from the first wireless signal processing circuitry among the N wireless signal processing circuitries;

a second signal processing circuitry configured to acquire a second digital signal, based on the second analog signal selected by the first selector; and a controller configured to estimate a channel from the power receiver, based on the first digital signal and the second digital signal.

2. The electronic apparatus according to claim 1, wherein the first selector includes a plurality of switches configured to connect the (N−1) second wireless signal processing circuitries to the second signal processing circuitry.

3. The electronic apparatus according to claim 1, wherein the first selector is configured to select one of the plurality of second analog signals in turn, according to a plurality of times, and the controller is configured to estimate the channel from the power receiver, based on the second digital signal acquired from the second analog signal selected at each of the times, and the first digital signal acquired from the corresponding first analog signal at each of the times.

4. The electronic apparatus according to claim 1, wherein the first digital signal includes information on an amplitude and a phase of the wireless signal inputted into the first wireless signal processing circuitry, the second digital signal includes information on an amplitude and a phase of the wireless signal inputted into the second wireless signal processing circuitry, and the controller is configured to estimate the channel, based on a difference in the phase, or a difference in the amplitude and a difference in the phase, between the first digital signal and the second digital signal.

5. The electronic apparatus according to claim 3, wherein the N wireless signal processing circuitries each include a phase shifter configured to make a phase shift in the wireless signal, the controller is configured to control, based on information on the channel, an amount of the phase shift made by each of the phase shifters in at least two wireless signal processing circuitries, among the phase shifters in the N wireless signal processing circuitries, and the electronic apparatus further comprises a synthesizer configured to synthesize the analog signals acquired by the at least two wireless signal processing circuitries.

6. The electronic apparatus according to claim 5, wherein the controller is configured to determine, based on the synthesized signals acquired by the synthesizer synthesizing the analog signals, whether or not wireless equipment different from the power receiver exists in a direction including a direction of the power receiver.

7. The electronic apparatus according to claim 6, wherein the controller is configured to determine not to perform the wireless power transfer to the power receiver when the wireless equipment is included in the direction including the direction of the power receiver, and the controller is configured to determine to perform the wireless power transfer to the power receiver when the wireless equipment is not included in the direction including the direction of the power receiver.

8. The electronic apparatus according to claim 1, further comprising a signal generator configured to generate a detection signal for detecting an object, wherein the first wireless signal processing circuitry is configured to acquire the first analog signal, based on the wireless signal received by a first antenna element among the N antenna elements, the (N−1) second wireless signal processing circuitries are configured to acquire the second analog signals, based on the wireless signals received by second to N-th antenna elements among the N antenna elements, two or more of the (N−1) second wireless signal processing circuitries are configured to transmit the detection signal from the signal generator from the respective corresponding antenna elements, the first wireless signal processing circuitry is configured to acquire a plurality of reception signals, based on reflected signals of the plurality of detection signals, the reflected signals received via the first antenna element, and the electronic apparatus comprises a controller configured to detect at least one of a position and a direction of an object existing in a power transfer area, based on a plurality of digital signals acquired by the first signal processing circuitry based on the plurality of reception signals.

9. The electronic apparatus according to claim 8, wherein the controller is configured to control the wireless power transfer to the power receiver, based on the detected at least one of the position and the direction of the object.

10. The electronic apparatus according to claim 8, wherein the object is a human, and for the detection signal, an effective value of electric field strength is equal to or less than 137 V/m, an effective value of magnetic field strength is equal to or less than 0.365 A/m, or power flux density is equal to or less than 5 mW/cm$^2$.

11. The electronic apparatus according to claim 8, wherein the controller is configured to determine not to perform the wireless power transfer when the object is included in a direction including a direction of the power receiver, and the controller is configured to determine to perform the wireless power transfer when the object is not included in the direction including the direction of the power receiver.

12. The electronic apparatus according to claim 8, wherein when the object is included in a direction including a direction of the power receiver, the controller is configured to generate a null in the direction in which the object exists, and to perform the wireless power transfer to the power receiver.

13. The electronic apparatus according to claim 12, wherein the object is a human, and the controller is configured to generate the null in such a manner that for radio waves to which the human is exposed, an effective value of electric field strength becomes equal to or less than 137 V/m, an effective value of magnetic field strength becomes equal to or less than 0.365 A/m, or power flux density becomes equal to or less than 5 mW/cm$^2$.

14. The electronic apparatus according to claim 8, wherein
the detection signal is an oscillator signal,
the electronic apparatus further comprises a first switcher configured to selectively switch between feeding the oscillator signal to the first signal processing circuitry and the second signal processing circuitry, and feeding the oscillator signal as the detection signal to two or more of the second wireless signal processing circuitries,
the first signal processing circuitry includes a first mixer configured to convert a frequency of the first analog signal, based on the oscillator signal, and
the second signal processing circuitry includes a second mixer configured to convert a frequency of the second analog signal, based on the oscillator signal.

15. The electronic apparatus according to claim 1, further comprising a signal generator configured to generate a power transfer signal, wherein
the N wireless signal processing circuitries each include a phase shifter configured to make a phase shift in the power transfer signal,
the controller is configured to control an amount of the phase shift made by the phase shifter in each of at least two wireless signal processing circuitries among the N wireless signal processing circuitries, based on information on the channel, and
the wireless power transfer is performed by transmitting the power transfer signals in which the phase shifts are made by the phase shifters in the at least two wireless signal processing circuitries, from the respective corresponding antenna elements.

16. The electronic apparatus according to claim 15, wherein
the power transfer signal is an oscillator signal,
the electronic apparatus further comprises a second switcher configured to selectively switch between feeding the oscillator signal to the first signal processing circuitry and the second signal processing circuitry, and feeding the oscillator signal as the power transfer signal to the at least two wireless signal processing circuitries,
the first signal processing circuitry includes a first mixer configured to convert a frequency of the first analog signal, based on the oscillator signal, and
the second signal processing circuitry includes a second mixer configured to convert a frequency of the second analog signal, based on the oscillator signal.

17. The electronic apparatus according to claim 1, further comprising a second selector configured to select one of the N wireless signal processing circuitries, wherein
the selected wireless signal processing circuitry is the first wireless signal processing circuitry, and
the other (N−1) wireless signal processing circuitries than the selected wireless signal processing circuitry are the (N−1) second wireless signal processing circuitries.

18. The electronic apparatus according to claim 17, wherein the second selector includes a switch circuit configured to selectively connect the N wireless signal processing circuitries to the first signal processing circuitry.

19. The electronic apparatus according to claim 1, wherein the wireless signal transmitted from the power receiver is a beacon signal.

20. A method performed by an electronic apparatus that is capable of wireless power transfer to a power receiver that transmits a wireless signal, comprising:
acquiring a first analog signal based on a first wireless signal received by a first antenna element among N antenna elements (N is a natural number greater than or equal to 3);
acquiring a first digital signal based on the first analog signal;
acquiring a plurality of second analog signals based on second wireless signals received by (N−1) second antenna elements;
selecting one of the second analog signals;
acquiring a second digital signal based on the selected second analog signal; and
estimating a channel from the power receiver, based on the first digital signal and the second digital signal.

* * * * *